United States Patent
Yuan et al.

(10) Patent No.: US 10,878,803 B2
(45) Date of Patent: Dec. 29, 2020

(54) SPEECH CONVERSION METHOD, COMPUTER DEVICE, AND STORAGE MEDIUM

(71) Applicant: Tencent Technology (Shenzhen) Company Limited, Shenzhen (CN)

(72) Inventors: Haolei Yuan, Shenzhen (CN); Xiao Mei, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 150 days.

(21) Appl. No.: 16/361,654

(22) Filed: Mar. 22, 2019

(65) Prior Publication Data
US 2019/0221201 A1   Jul. 18, 2019

Related U.S. Application Data

(63) Continuation of application No. PCT/CN2018/074435, filed on Jan. 29, 2018.

(30) Foreign Application Priority Data

Feb. 21, 2017 (CN) .......................... 2017 1 0093860

(51) Int. Cl.
*G10L 13/08* (2013.01)
*G10L 13/10* (2013.01)
(Continued)

(52) U.S. Cl.
CPC .............. *G10L 13/10* (2013.01); *G10L 13/06* (2013.01); *G10L 15/04* (2013.01); *G10L 15/07* (2013.01);
(Continued)

(58) Field of Classification Search
CPC ........ G10L 13/027; G10L 13/08; G10L 13/10
See application file for complete search history.

(56) References Cited

U.S. PATENT DOCUMENTS 5,040,218 A * 8/1991 Vitale ..................... G10L 13/08
704/260
5,153,913 A * 10/1992 Kandefer ................ G10L 13/07
704/260
(Continued)

FOREIGN PATENT DOCUMENTS

CN  101064103 A  10/2007
CN  106297765 A   1/2017
(Continued)

OTHER PUBLICATIONS

International Search Report and Written Opinion received for PCT Application No. PCT/CN2018/074435 dated Apr. 27, 2018 (with brief English translation), 14 pages.
(Continued)

*Primary Examiner* — Daniel Abebe
(74) *Attorney, Agent, or Firm* — Brinks Gilson & Lione

(57) ABSTRACT

A method, device, and storage medium for converting text to speech are described. The method includes obtaining target text; synthesizing first machine speech corresponding to the target text; and selecting an asynchronous machine speech whose prosodic feature matches a prosodic feature of the first machine speech from an asynchronous machine speech library. The method also includes searching a synchronous machine speech library for a first synchronous machine speech corresponding to the asynchronous machine speech; synthesizing, based on a prosodic feature of the first synchronous machine speech, second machine speech corresponding to the target text; and selecting a second synchronous machine speech matching an acoustic feature of the second machine speech from the synchronous machine
(Continued)

speech library. The method further includes splicing speaker speech units corresponding to the synchronous machine speech unit in a speaker speech library, to obtain a target speaker speech.

20 Claims, 11 Drawing Sheets

(51) Int. Cl.
  *G10L 15/08* (2006.01)
  *G10L 25/03* (2013.01)
  *G10L 15/07* (2013.01)
  *G10L 15/04* (2013.01)
  *G10L 25/51* (2013.01)
  *G10L 13/06* (2013.01)
  *G10L 15/26* (2006.01)
  *G10L 13/047* (2013.01)

(52) U.S. Cl.
  CPC .............. *G10L 15/08* (2013.01); *G10L 25/03* (2013.01); *G10L 25/51* (2013.01); *G10L 13/047* (2013.01); *G10L 15/26* (2013.01)

(56) References Cited

U.S. PATENT DOCUMENTS

| | | | | |
|---|---|---|---|---|
| 5,327,521 A | * | 7/1994 | Savic | G10L 21/00 704/200 |
| 5,987,412 A | * | 11/1999 | Breen | G10L 13/07 704/258 |
| 6,134,528 A | * | 10/2000 | Miller | G06F 40/284 704/258 |
| 6,961,704 B1 | | 11/2005 | Phillips et al. | |
| 8,527,276 B1 | * | 9/2013 | Senior | G06N 3/084 704/259 |
| 10,535,336 B1 | * | 1/2020 | Mohammadi | G10L 15/26 |
| 2002/0173962 A1 | | 11/2002 | Tang et al. | |
| 2006/0031073 A1 | | 2/2006 | Anglin et al. | |

FOREIGN PATENT DOCUMENTS

| | | |
|---|---|---|
| CN | 106920547 A | 7/2017 |
| EP | 1640968 A1 | 3/2006 |
| JP | 9305197 A | 11/1997 |
| JP | 2001-092482 A | 4/2001 |
| JP | 2013-171196 A | 9/2013 |
| KR | 10-2012-0117041 | 10/2012 |

OTHER PUBLICATIONS

Korean Office Action and concise explanation regarding 10-2019-7013802 dated Sep. 8, 2020, 7 pages.

* cited by examiner

SPEECH CONVERSION METHOD, COMPUTER DEVICE, AND STORAGE MEDIUM

RELATED APPLICATION

This application claims priority to PCT Patent Application No. PCT/CN2018/074435, filed on Jan. 29, 2018, which claims priority to Chinese Patent Application No. 201710093860.8, filed with the Chinese Patent Office on Feb. 21, 2017, both of which are incorporated by reference in their entireties.

FIELD OF THE TECHNOLOGY

This application relates to the field of computer technologies, and in particular, to a speech conversion method, a computer device, and a storage medium.

BACKGROUND OF THE DISCLOSURE

As computer technologies develop, speech content conversion is increasingly widely applied, for example, personalized sound is implemented in audio fiction reading or speech navigation. As life standards improve, people are no longer satisfied with conversion of only timbre in speech content conversion, and further require that converted speech better conforms to a speech habit and a speech style of a particular speaker.

In a conventional speech content conversion technology, when speech of a target speaker needs to be obtained by conversion, speech of another speaker is converted into the speech of the target speaker mainly by using a timbre conversion method. However, speech obtained by using the conventional speech conversion method cannot truly reflect a speech style of a speaker. As a result, a speech conversion effect is different from a true speaker to some extent.

SUMMARY

Embodiments of this disclosure provide a speech conversion method, a computer device, and a storage medium.

The present disclosure describes a method for converting text to speech. The method includes obtaining, by a device comprising a memory storing instructions and a processor in communication with the memory, target text. The method also includes synthesizing, by the device, a first machine speech corresponding to the target text and searching, by the device, an asynchronous machine speech library to select an asynchronous machine speech whose prosodic feature matches a prosodic feature of the first machine speech. The method also includes searching, by the device, a synchronous machine speech library to select a first synchronous machine speech corresponding to the asynchronous machine speech and synthesizing, by the device based on a prosodic feature of the selected synchronous machine speech, a second machine speech corresponding to the target text. The method also includes searching, by the device, the synchronous machine speech library to select a second synchronous machine speech whose acoustic feature matches an acoustic feature of the second machine speech. The method further includes splicing, by the device corresponding to the second synchronous machine speech, speaker speech units in a speaker speech library to obtain a target speaker speech. The text content of the synchronous machine speech library, text content of the asynchronous machine speech library, and text content of the speaker speech library are the same. A prosodic feature of the speaker speech library matches a prosodic feature of the synchronous machine speech library.

The present disclosure describes a device. The device includes a memory and a processor. The memory stores computer-readable instructions. When the computer-readable instructions are executed by the processor, the processor is configured to obtain target text and synthesize a first machine speech corresponding to the target text. When the computer-readable instructions are executed by the processor, the processor is configured to search an asynchronous machine speech library to select an asynchronous machine speech whose prosodic feature matches a prosodic feature of the first machine speech and search a synchronous machine speech library to select a first synchronous machine speech corresponding to the asynchronous machine speech, and synthesize, based on a prosodic feature of the first synchronous machine speech, a second machine speech corresponding to the target text. When the computer-readable instructions are executed by the processor, the processor is configured to search the synchronous machine speech library to select a second synchronous machine speech whose acoustic feature matches an acoustic feature of the second machine speech. When the computer-readable instructions are executed by the processor, the processor is further configured to splice speaker speech units in a speaker speech library, corresponding to the second synchronous machine speech, to obtain a target speaker speech. The text content of the synchronous machine speech library, text content of the asynchronous machine speech library, and text content of the speaker speech library are the same. A prosodic feature of the speaker speech library matches a prosodic feature the synchronous machine speech library.

The present disclosure further describes a non-transitory computer readable storage medium storing computer-readable instructions. When the computer-readable instructions are executed by a processor, the computer-readable instructions cause the processor to obtain target text, and synthesize a first machine speech corresponding to the target text. When the computer-readable instructions are executed by the processor, the computer-readable instructions cause the processor to search an asynchronous machine speech library to select an asynchronous machine speech whose prosodic feature matches a prosodic feature of the first machine speech, and search a synchronous machine speech library to select a first synchronous machine speech corresponding to the asynchronous machine speech. When the computer-readable instructions are executed by the processor, the computer-readable instructions cause the processor to synthesize, based on a prosodic feature of the first synchronous machine speech, a second machine speech corresponding to the target text, and search the synchronous machine speech library to select a second synchronous machine speech whose acoustic feature matches an acoustic feature of the second machine speech. When the computer-readable instructions are executed by the processor, the computer-readable instructions further cause the processor to splice speaker speech units in a speaker speech library, corresponding to the second synchronous machine speech, to obtain target speaker speech. The text content of the synchronous machine speech library, text content of the asynchronous machine speech library, and text content of the speaker speech library are the same. A prosodic feature of the speaker speech library matches a prosodic feature of the synchronous machine speech library.

Details of one or more embodiments of this application are provided in the following accompanying drawings and descriptions. Other features, objectives, and advantages of this application become obvious in the specification, the accompanying drawings, and the claims.

BRIEF DESCRIPTION OF THE DISCLOSURE

To describe the technical solutions in the embodiments of this application more clearly, the following briefly describes the accompanying drawings required for describing the embodiments. Apparently, the accompanying drawings in the following description show merely some embodiments of this application, and a person of ordinary skill in the art may still derive other drawings from these accompanying drawings without creative efforts.

DESCRIPTION OF EMBODIMENTS

To make the objectives, the technical solutions, and the advantages of this application more comprehensible, the following further describes this application in detail with reference to the accompanying drawings and the embodiments. It should be understood that specific embodiments described herein are only used to describe this application instead of limiting this application.

The present disclosure describes a method and a device for converting target text to target speaker speech having a speech habit and a speech style of a particular speaker. The device may obtain target text, synthesize first machine speech based on the target text, and select an asynchronous machine speech unit sequence whose prosodic feature matches the prosodic feature of the first machine speech from the asynchronous machine speech library. The device may then search the synchronous machine speech library for a first synchronous machine speech unit sequence corresponding to the asynchronous machine speech unit sequence, and synthesize, based on a prosodic feature of the synchronous machine speech unit sequence, second machine speech corresponding to the target text. The device may further select, based on an acoustic feature of the second machine speech, a second synchronous machine speech unit sequence matching the acoustic feature of the second machine speech from the synchronous machine speech library; select speaker speech units corresponding to the synchronous machine speech unit from the speaker speech library; and splice the selected speaker speech units to obtain target speaker speech. Consequently, the obtained target speaker speech may have the speech habit and the speech style of the particular speaker.

Figure 1:
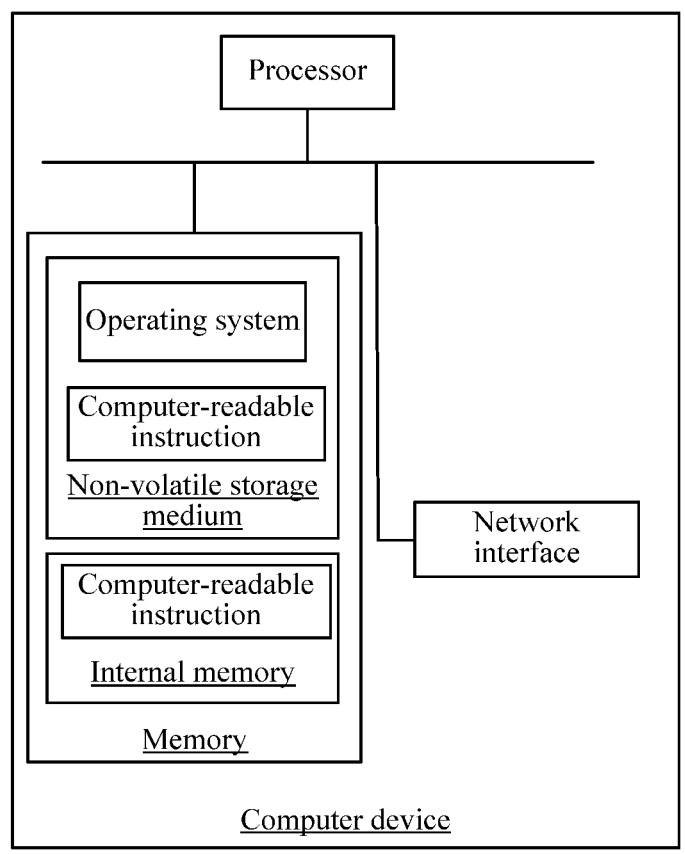
FIG. 1 is a schematic structural diagram of the interior of a computer device for implementing a speech conversion method according to an embodiment.

FIG. 1 is a schematic structural diagram of a computer device for implementing a speech conversion method according to an embodiment. The computer device may be a server or a terminal, the terminal may be a desktop terminal or a mobile terminal, and the mobile terminal may be at least one of a mobile phone, a tablet computer, a notebook computer, and the like. As shown in FIG. 1, the computer device includes a processor, a memory, and a network interface connected by using a system bus. The memory includes a non-volatile storage medium and an internal memory. The non-volatile storage medium of the computer device may store an operating system and computer-readable instructions. When the computer-readable instructions are executed, the processor is caused to perform a speech conversion method. The processor is configured to provide computing and control capabilities and supports running of the entire terminal. The internal memory of the computer device may store computer-readable instructions, and when the computer-readable instructions are executed by the processor, the processor may be caused to perform a speech conversion method. A person skilled in the art may understand that the structure shown in FIG. 1 is only a block diagram of a partial structure related to the solution of this application and does not limit the computer device to which the solution of this application is applied. The computer device may specifically include more or less components than those in the figure, or some components may be combined, or a different component deployment may be used.

Figure 2:
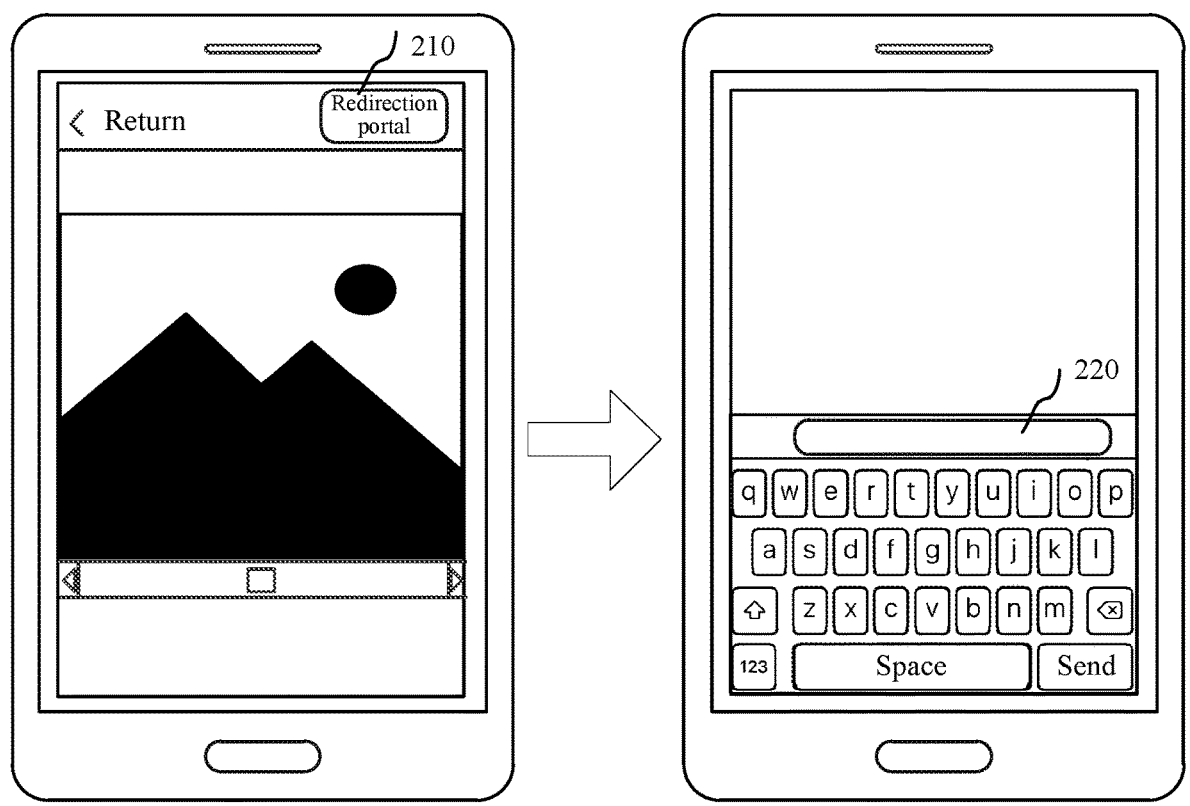
FIG. 2 is a schematic diagram of an interface of implementing a speech conversion method on a terminal according to an embodiment.

FIG. 2 is a schematic diagram of an interface of implementing a speech conversion method on a terminal according to an embodiment. Specifically, the terminal may run an application program used to perform the speech conversion method. As shown in the left figure in FIG. 2, the user may run an application program and play multimedia data. When speech included in the multimedia data has a content error and needs to be rectified or adjusted based on a video picture, a user may determine, in the played multimedia data, the speech that needs to be rectified or adjusted, and jump to an interface shown in the right figure in FIG. 2 by using a redirection portal 210. The user may input text content in a text input box 220 provided by the application program. The text content is correct text content corresponding to the speech that needs to be rectified or adjusted. In this way, after the application program converts text content inputted by the user in the text input box into speech, the speech obtained by conversion may replace speech content that needs to be rectified or redirected.

In another scenario, for example, the application program may be specifically a social application program. When intending to send target speaker speech during social conversation by using the social application program, the user may input text content in a text input box provided by the social application program. The text content is text content corresponding to speech that the user intends to synthesize. In this way, after converting the text content inputted by the user in the text input box into speech, the social application program may send the speech obtained by conversion.

Specifically, after obtaining the text content inputted by the user, the terminal uses the text content as target text, synthesizes the first machine speech corresponding to the target text, selects an asynchronous machine speech unit sequence whose prosodic feature matches a prosodic feature of the first machine speech from an asynchronous machine speech library, and searches a synchronous machine speech library for a first synchronous machine speech unit sequence corresponding to the asynchronous machine speech unit sequence, to obtain a prosodic feature conforming to a speech style of a speaker.

Further, the terminal may synthesize, based on the prosodic feature of the first synchronous machine speech unit sequence, second machine speech corresponding to the target text, select a synchronous machine speech unit matching an acoustic feature of the second machine speech from the synchronous machine speech library, and splice speaker speech units corresponding to the synchronous machine speech unit in a speaker speech library, to obtain target speaker speech. After obtaining the target speaker speech, the terminal may send the obtained target speaker speech to a terminal corresponding to another conversation user in the current conversation.

Text content of the synchronous machine speech library, the asynchronous machine speech library, and the speaker speech library is the same, and prosodic features of the speaker speech library and the synchronous machine speech library match each other. In another embodiment, the terminal may upload the asynchronous machine speech library, the synchronous machine speech library, and the speaker speech library to a server, so that the server may also implement the speech conversion method based on the asynchronous machine speech library, the synchronous machine speech library, and the speaker speech library.

Figure 3:
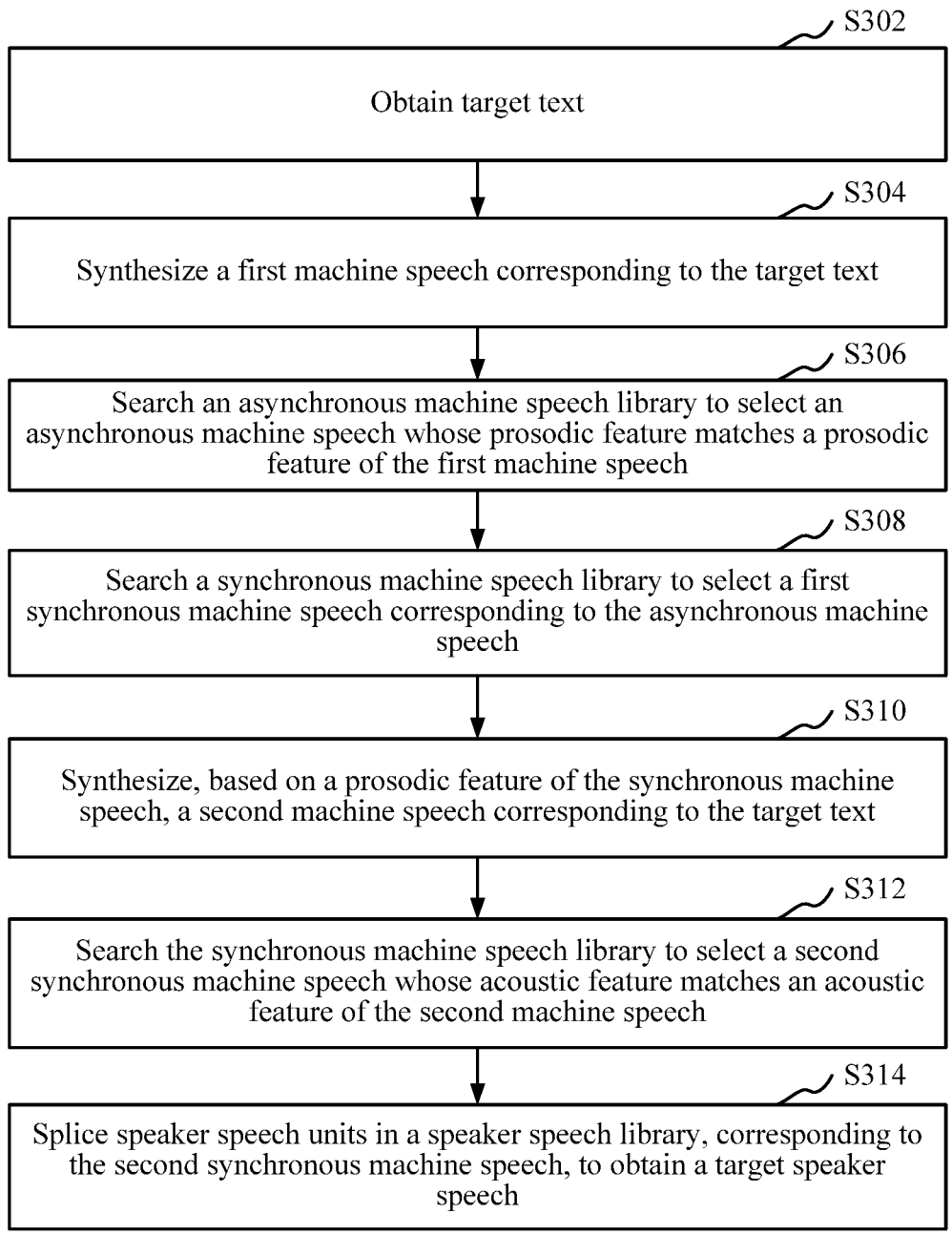
FIG. 3 is a schematic flowchart of a speech conversion method according to an embodiment.

As shown in FIG. 3, an embodiment provides a speech conversion method, and this embodiment is described by using an example in which the method is applied to the terminal in FIG. 1. The method specifically includes the following steps:

S302: Obtain target text.

The target text is text content corresponding to to-be-converted target speaker speech. The text content is a character string formed by more than one character in an order. In this embodiment, the text content corresponding to the to-be-converted target speaker speech may be content that is not spoken by the speaker.

Specifically, the terminal may provide an input interface to obtain text content that is inputted by a user by using the input interface and that requires speech conversion, and use the obtained text content as the target text.

S304: Synthesize first machine speech corresponding to the target text.

Machine speech is audio data that is obtained by an automatic speech synthesizing system by processing and that conforms to a speech style of the automatic speech synthesizing system. The first machine speech is machine speech whose timbre and prosodic feature both conform to the speech style of the automatic speech synthesizing system. A timbre refers to a characteristic of a sound made by a sound source, and timbres of sounds made by different sound sources are different because of different materials and structures. A timbre is represented by a spectrum parameter in physics. The prosodic feature is a basic tone and rhythm of a sound made by a sound source, and is represented by a fundamental frequency parameter, duration distribution, and signal strength in physics. The automatic speech synthesizing system is a system used for speech synthesizing, and may be specifically a text to speech (TTS) parameter synthesizing system.

Specifically, after obtaining the target text, the terminal may synthesize speech based on the TTS parameter synthesizing system. The terminal may first perform linguistics analysis on the target text, to determine a layer structure of a sentence and phoneme composition of each word, including sentence segmentation of text, word segmentation, polyphonic character processing, digit processing, abbreviation processing, and the like. The terminal may then perform sound synthesizing on the processed text by using the automatic speech synthesizing system, and convert the processed text into a speech waveform based on a TTS prosodic feature, to obtain the first machine speech.

S306: Select an asynchronous machine speech whose prosodic feature matches a prosodic feature of the first machine speech from an asynchronous machine speech library. The asynchronous machine speech may include an asynchronous machine speech unit sequence.

The text content of the synchronous machine speech library, the text content of the asynchronous machine speech library, and text content of the speaker speech library may be the same. The prosodic features of the speaker speech library and the prosodic features of the synchronous machine speech library match each other.

The speaker speech library includes several speaker speech unit sequences. The speaker speech unit sequence is a sequence including at least one speaker speech unit in an order. The speaker speech unit sequences in the speaker speech library are all selected from history speech of the speaker. Both a timbre and a prosodic feature may conform to a speech style of the speaker.

In one implementation, each of the speaker speech unit sequences in the speaker speech library may have a corresponding machine speech unit sequence in a machine speech library. The corresponding machine speech unit sequence may have the same text content as the speaker speech unit, but may not conform to a prosodic feature of the speaker. Therefore, the corresponding machine speech unit sequences may be referred to as asynchronous machine speech unit sequences and this machine speech library may be referred to as an asynchronous machine speech library. The asynchronous machine speech unit sequences form the asynchronous machine speech library.

In another implementation, each of the speaker speech unit sequences in the speaker speech library may have a corresponding machine speech unit sequence in another machine speech library. The corresponding machine speech unit sequence may have the same text content as the speaker speech unit sequence, and may match/conform to prosodic features of the speaker. Therefore, the machine speech unit sequences are referred to as synchronous machine speech unit sequences and this machine speech library may be referred to as synchronous machine speech library. The synchronous machine speech unit sequences form the synchronous machine speech library.

Further, the asynchronous machine speech library, the synchronous machine speech library, and the speaker speech library may be aligned based on text content, and/or may be combined as a parallel speech library. The asynchronous machine speech library, the synchronous machine speech library, and the speaker speech library may all be stored in a file, a database, or a cache, and/or may be obtained from the file, the database, or the cache as required.

Specifically, the terminal may sequentially obtain asynchronous machine speech unit sequences in the asynchronous machine speech library through enumeration, compare prosodic features of the obtained asynchronous machine speech unit sequences with that of the first machine speech, and after completing comparison between each asynchronous machine speech unit sequence included in the asynchronous machine speech library and the first machine speech, select an asynchronous machine speech unit sequence whose prosodic feature is most similar to that of the first machine speech as a matched asynchronous machine speech unit sequence.

Comparing the prosodic features includes comparing fundamental frequency parameters corresponding to each asynchronous machine speech unit sequence and the first machine speech, and comparing duration distribution corresponding to each asynchronous machine speech unit sequence and the first machine speech.

S308: Search the synchronous machine speech library for a first synchronous machine speech corresponding to the asynchronous machine speech unit sequence. The first synchronous machine speech may include a first synchronous machine speech unit sequence.

The speech unit is a time dimension defined by the terminal. In this embodiment, the terminal performs speech unit segmentation on the history speaker speech based on a Chinese pinyin building manner. For example, pinyin of a Chinese character "unit" is "danyuan", and four speech units may be obtained through segmentation based on the Chinese pinyin building manner, and are respectively "d", "an", "y", and "uan". In another embodiment, the terminal may alternatively perform speech unit segmentation based on a character, a phoneme, and the like.

Specifically, the terminal may search the synchronous machine speech library for a first synchronous machine speech unit sequence whose correspondence with an asynchronous machine speech unit sequence is established by using text content, to obtain the first synchronous machine speech unit sequence.

S310: Synthesize, based on a prosodic feature of the first synchronous machine speech, second machine speech corresponding to the target text.

The second machine speech is machine speech whose timbre conforms to the speech style of the automatic speech synthesizing system but whose prosodic feature conforms to the speaker speech style. The second machine speech and the first machine speech are both machine speech, but are different machine speech.

Specifically, the terminal may synthesize, by using the automatic speech synthesizing system based on the prosodic feature of the first synchronous machine speech unit sequence, the second machine speech conforming to the prosodic feature of the speaker.

For example, assuming that the target text content is "xiao qiao liu shui ren jia", the first machine speech synthesized based on the TTS parameter synthesizing system and a TTS prosodic feature is "xiao qiao liu-shui-ren jia", the first synchronous machine speech unit sequence found from the synchronous machine speech library is "kuteng-laoshu-hunya", and the second machine speech synthesized based on the TTS parameter synthesizing system and the prosodic feature of the first synchronous machine speech unit sequence is "xiao qiao-liu shui-ren jia", where "-" indicates a pause.

S312: Select a second synchronous machine speech matching an acoustic feature of the second machine speech from the synchronous machine speech library. The second synchronous machine speech may include a second synchronous machine speech unit sequence.

The acoustic feature is a feature of a sound wave generated by vibration of a sound source in physics. The acoustic parameter is a parameter used to represent the acoustic feature, and specifically includes a fundamental frequency parameter, a spectrum parameter, an aperiodic signal parameter, and the like.

Specifically, the terminal may obtain a corresponding machine speech unit sequence based on unit segmentation of the second machine speech in a generation stage, and search the synchronous machine speech library for a synchronous machine speech unit having a same pronunciation as a candidate synchronous machine speech unit based on a pronunciation annotation of each speech unit in the generation stage.

The terminal may then search for a unit acoustic parameter that is stored in the synchronous machine speech library and that corresponds to the candidate synchronous machine speech unit, compare the found unit acoustic parameter with a corresponding unit acoustic parameter of a speech unit in the second machine speech one by one, and after comparison between the unit acoustic parameters is completed, select a candidate synchronous machine speech unit most similar to the acoustic parameter of the second machine speech as the speaker speech unit having a matched acoustic feature.

S314: Splice speaker speech units corresponding to the second synchronous machine speech in the speaker speech library, to obtain target speaker speech. The second synchronous machine speech may include a synchronous machine speech unit or a second synchronous machine speech unit sequence.

Specifically, the terminal may search the speaker speech library for a speaker speech unit whose correspondence with the synchronous machine speech unit is established by using text content, and splice found speaker speech units to obtain the target speaker speech.

In the speech conversion method, the speech unit used to obtain the target speaker speech through splicing is selected from the speaker speech library, and the spliced and converted speech retains the timbre of the speaker. In addition, a correspondence between the asynchronous machine speech unit sequence conforming to the machine prosodic feature in the asynchronous machine speech library and the first synchronous machine speech unit sequence conforming to the prosodic feature of the speaker in the synchronous machine speech library is used. After the first machine speech conforming to the machine prosodic feature is synthesized, the prosodic feature conforming to the speech style of the speaker is determined based on the correspondence. The second machine speech is then synthesized based on the prosodic feature, and the synchronous machine speech unit matching the acoustic feature of the second machine speech is selected from the synchronous machine speech library based on the acoustic feature of the second machine speech. Speaker speech units corresponding to the selected synchronous machine speech unit in the speaker speech library are spliced to obtain the target speaker speech, thereby retaining the prosodic feature of the speaker. In this way, both the timbre of the speaker and the prosodic feature of the speaker are retained, so that the speech obtained by conversion is more natural and better conforms to the required speech style of the speaker, thereby improving a speech conversion effect.

Figure 4:
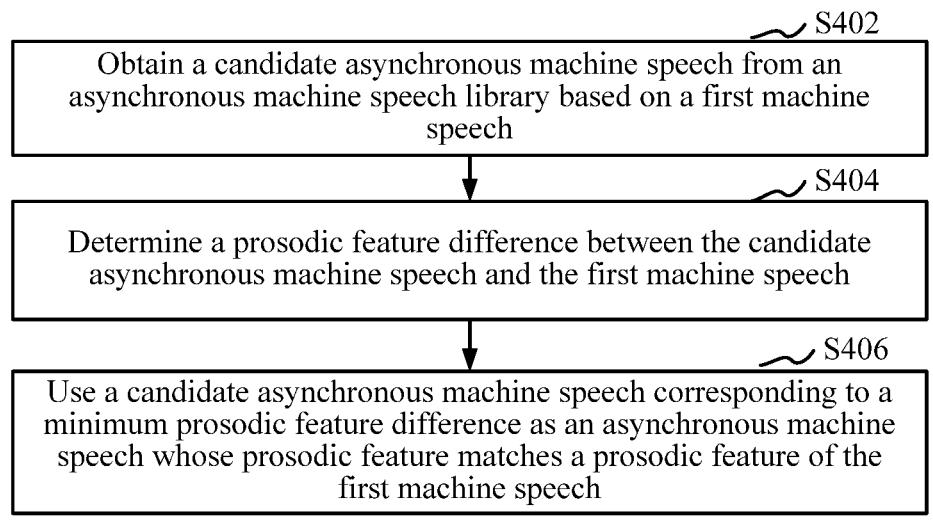
FIG. 4 is a schematic flowchart of a step of selecting an asynchronous machine speech unit sequence whose prosodic feature matches a prosodic feature of first machine speech from an asynchronous machine speech library according to an embodiment.

As shown in FIG. 4, in an embodiment, step S306 includes the following steps:

S402: Obtain a candidate asynchronous machine speech unit sequence from the asynchronous machine speech library based on the first machine speech.

Specifically, the terminal may classify asynchronous machine speech unit sequences in the asynchronous machine speech library in advance based on quantities of asynchronous machine speech units included in the asynchronous machine speech unit sequences. After synthesizing the first machine speech, the terminal may collect, based on speech unit segmentation during generation of the first machine speech, statistics on quantities of machine speech units obtained through segmentation, and obtain, from the asynchronous machine speech library, an asynchronous machine speech unit sequence including a quantity of asynchronous machine speech units greater than or equal to the quantity obtained through statistics collection to serve as the candidate speech unit sequence.

In an embodiment, step S402 specifically includes: determining a quantity of machine speech units included in the first machine speech; and obtaining a candidate asynchronous machine speech unit sequence including the same quantity of asynchronous machine speech units as the determined quantity from the asynchronous machine speech library.

Specifically, the terminal may preconfigure a candidate condition used to select the asynchronous machine speech unit sequence. The candidate condition is that a quantity of included asynchronous machine speech units is the same as a quantity of machine speech units included in the first machine speech. When the quantity of asynchronous machine speech units included in the asynchronous machine speech unit sequence is greater than or is equal to the quantity of machine speech units included in the first machine speech, it is determined that the candidate condition is satisfied, and the asynchronous machine speech unit sequence or an asynchronous machine speech unit sub-sequence included in the asynchronous machine speech unit sequence is used as the candidate asynchronous machine speech unit sequence.

In this embodiment, the candidate asynchronous machine speech unit sequence is selected based on the quantity of machine speech units included in the first machine speech, to calculate the prosodic feature difference, thereby improving reliability of a calculation result of the prosodic feature difference.

In an embodiment, the step of obtaining a candidate asynchronous machine speech unit sequence including the same quantity of asynchronous machine speech units as the determined quantity from the asynchronous machine speech library specifically may include: traversing asynchronous machine speech unit sequences included in the asynchronous machine speech library to obtain the traversed asynchronous machine speech. In another implementation, the act may include searching the asynchronous machine speech library to obtain an asynchronous machine speech, and thus, the obtained asynchronous machine speech may be the traversed asynchronous machine speech.

This step of obtaining a candidate asynchronous machine speech unit sequence including the same quantity of asynchronous machine speech units as the determined quantity from the asynchronous machine speech library specifically may also include: when a quantity of asynchronous machine speech units included in an asynchronous machine speech unit sequence that is traversed to is less than the determined quantity, continuing the traversal; when a quantity of asynchronous machine speech units included in an asynchronous machine speech unit sequence that is traversed to is equal to the determined quantity, using the asynchronous machine speech unit sequence that is traversed to as the candidate asynchronous machine speech unit sequence; and when a quantity of asynchronous machine speech units included in an asynchronous machine speech unit sequence that is traversed to is greater than the determined quantity, segmenting the asynchronous machine speech unit sequence that is traversed to, to obtain the candidate asynchronous machine speech unit sequence based on a sequence of the included asynchronous machine speech units and the determined quantity.

In this embodiment, an asynchronous machine speech unit sequence including a quantity of asynchronous machine speech units greater than the quantity of machine speech units included in the second machine speech is segmented to obtain an asynchronous machine speech unit sub-sequence as the candidate asynchronous machine speech unit sequence based on a sequence of the included asynchronous machine speech units and the determined quantity, thereby conforming to natural language coherency, ensuring reliability of a calculation result of the prosodic feature difference, and improving corpus usage of the asynchronous machine speech library.

For example, assuming that the first machine speech may be segmented to obtain three machine speech units: a-b-c, when the terminal traverses asynchronous machine speech unit sequences included in the asynchronous machine speech library, when an asynchronous machine speech unit sequence that is traversed to is: d-e, the asynchronous machine speech unit sequence includes two asynchronous machine speech units. This does not conform to the candidate condition, and traversal continues. When an asynchronous machine speech unit sequence that is traversed to is: f-g-h, the asynchronous machine speech unit sequence includes three asynchronous machine speech units. This conforms to the candidate condition, and the terminal may directly use "f-g-h" as the candidate asynchronous machine speech unit sequence.

When an asynchronous machine speech unit sequence that is traversed to is: i-j-k-l, the asynchronous machine speech unit sequence includes four asynchronous machine speech units, and this conforms to the candidate condition. However, because the quantity of asynchronous machine speech units included in the asynchronous machine speech unit sequence is greater than the quantity of machine speech units included in the first machine speech, the asynchronous machine speech unit sequence needs to be segmented to obtain an asynchronous machine speech unit sub-sequence including a quantity of asynchronous machine speech units equal to the quantity of machine speech units included in the first machine speech. Because the asynchronous machine speech unit sequence is unidirectional, the terminal may use asynchronous machine speech unit sub-sequences "i-j-k", "j-k-l", "i-k-l", and "i-j-l" as the candidate asynchronous machine speech unit sequences.

S404: Determine a prosodic feature difference between the candidate asynchronous machine speech unit sequence and the first machine speech.

Specifically, after selecting the candidate asynchronous machine speech unit sequence, the terminal may sequentially calculate the prosodic feature difference between each candidate asynchronous machine speech unit sequence and the first machine speech.

In an embodiment, step S404 specifically includes: segmenting the first machine speech to obtain machine speech units; generating the prosodic feature difference between the candidate asynchronous machine speech unit sequence and the first machine speech based on a prosodic parameter difference between each asynchronous machine speech unit included in the candidate asynchronous machine speech unit sequence and a respective corresponding machine speech unit obtained by segmentation, where the prosodic parameter difference includes at least one of a duration difference, a fundamental frequency change rate difference, a duration distribution difference of an acoustic parameter, and a probability distribution difference of a fundamental frequency change rate.

Specifically, the terminal may obtain a unit prosodic parameter by using the prosodic parameter of the first machine speech that is obtained during synthesizing of the first machine speech and corresponding machine speech unit segmentation. The terminal may further obtain a unit prosodic parameter corresponding to each asynchronous machine speech unit included in the candidate asynchronous machine speech unit sequence, and calculate a difference between the unit prosodic parameter corresponding to the asynchronous machine speech unit and a corresponding unit prosodic parameter corresponding to a segmented machine speech unit, to calculate the prosodic feature difference between the candidate asynchronous machine speech unit sequence and the first machine speech.

In this embodiment, the prosodic feature difference is calculated by using the prosodic parameter difference between each asynchronous machine speech unit included in the candidate asynchronous machine speech unit sequence and a corresponding machine speech unit obtained by segmentation, and parameters influencing the prosodic feature are used for calculation, thereby improving matching accuracy of the prosodic feature.

The prosodic feature difference between the asynchronous machine speech unit sequence and the first machine speech may be calculated by using the following formula:

$$C_{prosody} = \sum_{n=1}^{N} w_n \cdot |f_A - f_B| = \sum_{n=1}^{N} w_n \cdot \begin{bmatrix} \Delta T_{curr} \\ \Delta T_{head} \\ \Delta T_{tail} \\ |\Delta F_{0,A} - \Delta F_{0,B}| \\ -KLD(P_{T,A}, P_{T,B}) \\ -KLD(P_{\Delta F_{0,A}}, P_{\Delta F_{0,B}}) \end{bmatrix}. \quad (1)$$

$f_A$ indicates a prosodic feature parameter of a candidate asynchronous machine speech unit sequence A, $f_B$ indicates a prosodic feature parameter of a first machine speech B, N indicates a quantity of prosodic features selected during calculation of the prosodic feature difference, $w_n$ indicates a weight of an $n^{th}$ prosodic feature, $C_{prosody}$ indicates the prosodic feature difference, and a smaller value of $C_{prosody}$ indicates that the prosodic features of the candidate asynchronous machine speech unit sequence A and the first machine speech B better match each other. The prosodic parameter difference $|f_A - f_B|$ of the candidate asynchronous machine speech unit sequence A and the first machine speech B includes at least one of a duration difference, a fundamental frequency change rate difference, a duration distribution difference of an acoustic parameter, and a probability distribution difference of a fundamental frequency change rate.

The duration difference includes a difference $\Delta T_{head}$ between speech pause duration before the asynchronous machine speech unit and speech pause duration before the corresponding machine speech unit obtained by segmentation, a difference $\Delta T_{curr}$ between pronunciation duration of the asynchronous machine speech unit and pronunciation duration of the corresponding machine speech unit obtained by segmentation, and a difference $\Delta T_{tail}$ between speech pause duration after the asynchronous machine speech unit and speech pause duration after the corresponding machine speech unit obtained by segmentation.

$\Delta F_{0,A}$ indicates a fundamental frequency change rate of the candidate asynchronous machine speech unit sequence A, and $\Delta F_{0,B}$ indicates a fundamental frequency change rate of the first machine speech B. The fundamental frequency change rate is a first derivative of a fundamental frequency. $|\Delta F_{0,A} - \Delta F_{0,B}|$ indicates a difference between the fundamental frequency change rates of the candidate asynchronous machine speech unit sequence A and the first machine speech B.

$P_{T,A}$ indicates duration distribution of an acoustic parameter corresponding to the candidate asynchronous machine speech unit sequence A, $P_{T,B}$ indicates duration distribution of an acoustic parameter corresponding to the first machine speech B, and $KLD(P_{T,A}, P_{T,B})$ indicates solving a Kullback-Leibler divergence (KLD) between the duration distribution of the acoustic parameters corresponding to the candidate asynchronous machine speech unit sequence A and the first machine speech B. In this embodiment, modeling is performed on the duration distribution of the acoustic parameter by using Gaussian distribution, $P_{T,A}$ is equivalent to an average value and a variance of the duration distribution of the asynchronous machine speech unit sequence A, and $P_{T,B}$ is equivalent to an average value and a variance of the duration distribution of the first machine speech B.

$P_{\Delta F_{0,A}}$ indicates probability distribution of the fundamental frequency change rate corresponding to the candidate asynchronous machine speech unit sequence A, $P_{\Delta F_{0,B}}$ indicates probability distribution of the fundamental frequency change rate corresponding to the first machine speech B, and $KLD(P_{\Delta F_{0,A}}, P_{\Delta F_{0,b}})$ indicates solving a KL divergence between the probability distribution of the fundamental frequency change rates corresponding to the candidate asynchronous machine speech unit sequence A and the first machine speech B. In this embodiment, modeling is performed on the probability distribution of the fundamental frequency change rate by using Gaussian distribution, $P_{\Delta F_{0,A}}$ is equivalent to an average value and a variance of the probability distribution of the fundamental frequency change rate of the asynchronous machine speech unit sequence A, and $P_{\Delta F_{0,B}}$ is equivalent to an average value and a variance of the probability distribution of the fundamental frequency change rate of the first machine speech B.

In a one-dimensional single Gaussian model, KLD is specifically defined as follows:

$$KLD(p_A(x|u_1,\sigma_1), p_B(x|u_2,\sigma_2)) = -\int p_A(x) \log p_B(x) dx + \int p_A(x) \log p_A(x) dx \quad (2).$$

$p_A(x|u_1,\sigma_1)$ indicates that the prosodic parameter of the asynchronous machine speech unit sequence A conforms to Gaussian distribution having an average value of $u_1$ and a variance of $\sigma_1$. $p_A(x|u_2,\sigma_2)$ indicates that the prosodic parameter of the first machine speech B conforms to Gaussian distribution having an average value of $u_2$ and a variance of $\sigma_2$.

S406: Use a candidate asynchronous machine speech unit sequence corresponding to a minimum prosodic feature difference as the asynchronous machine speech unit sequence whose prosodic feature matches the prosodic feature of the first machine speech.

In this embodiment, the prosodic feature difference between the asynchronous machine speech unit sequence in the asynchronous machine speech library and the first machine speech is calculated, and is used as a restriction condition, and the asynchronous machine speech unit sequence matching the prosodic feature of the first machine speech is selected, thereby improving accuracy of selecting the prosodic feature, so that the speech obtained by conversion is more natural and better conforms to the required speech style of the speaker.

Figure 5:
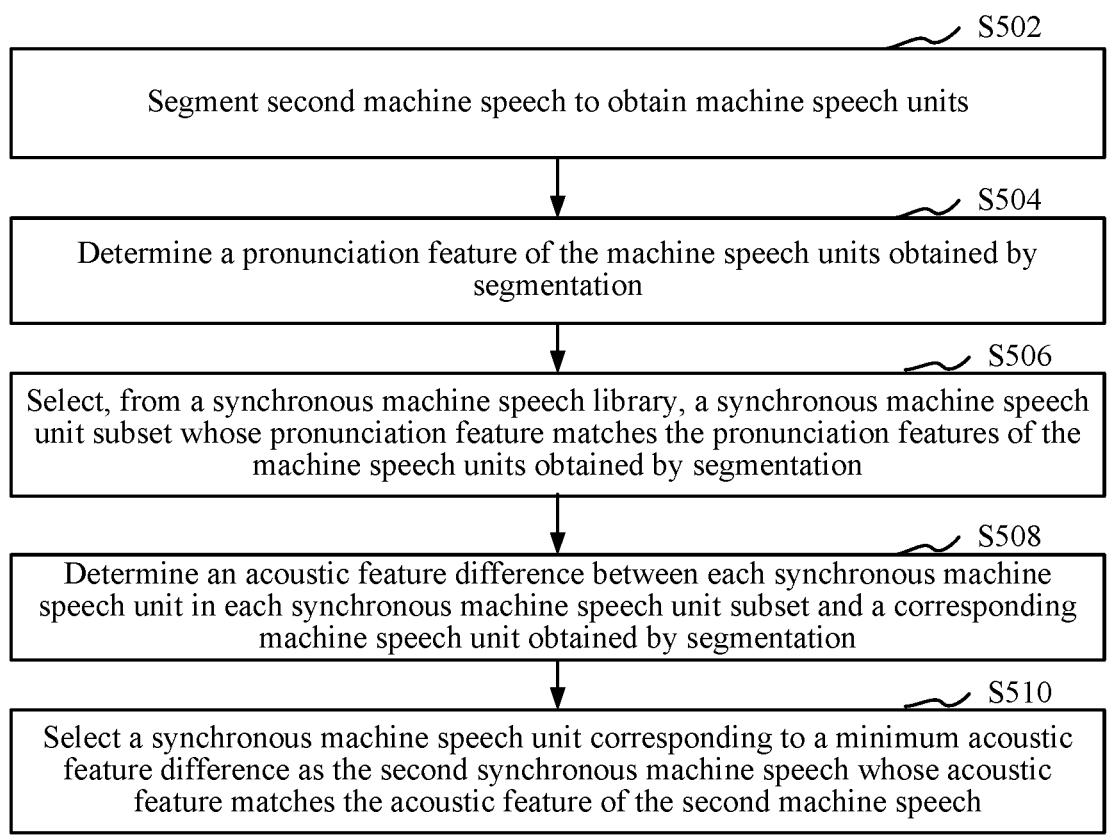
FIG. 5 is a schematic flowchart of a step of selecting a synchronous machine speech unit matching an acoustic feature of second machine speech from a synchronous machine speech library according to an embodiment.

As shown in FIG. 5, in an embodiment, step S312 specifically includes the following steps:

S502: Segment the second machine speech to obtain machine speech units.

S504: Determine pronunciation features of the machine speech units obtained by segmentation.

S506: Select, from the synchronous machine speech library, a synchronous machine speech unit subset whose pronunciation feature matches the pronunciation features of the machine speech units obtained by segmentation.

Specifically, the terminal may traverse the synchronous machine speech units in the synchronous machine speech library, compare a pronunciation of a traversed synchronous machine speech unit with an annotated pronunciation of the second machine speech during traversal, and when the pronunciation of the traversed synchronous machine speech unit is consistent with the annotated pronunciation of the second machine speech, select the synchronous machine speech unit, to obtain the synchronous machine speech unit subset whose pronunciation feature matches the pronunciation features of the machine speech units obtained by segmentation.

S508: Determine an acoustic feature difference between each synchronous machine speech unit in each synchronous machine speech unit subset and a corresponding machine speech unit obtained by segmentation.

Specifically, the terminal may traverse the synchronous machine speech units in each synchronous machine speech unit subset, obtain an acoustic parameter corresponding to a traversed synchronous machine speech unit during traversal, and calculate an acoustic feature difference between the obtained acoustic parameter and an acoustic parameter corresponding to a corresponding machine speech unit obtained by segmentation one by one.

In an embodiment, step S508 specifically includes the following steps: determining an acoustic parameter of each synchronous machine speech unit in each synchronous machine speech unit subset; determining acoustic parameters of the machine speech units obtained by segmentation; calculating a corresponding acoustic parameter difference between each synchronous machine speech unit and a corresponding machine speech unit obtained by segmentation; and generating, based on the calculated difference, an acoustic feature difference in positive correlation with the difference.

Specifically, the terminal may search the synchronous machine speech library for a unit acoustic parameter corresponding to the synchronous machine speech unit. The terminal may alternatively obtain a unit acoustic parameter corresponding to each speech unit of the second machine speech that is outputted by using an acoustic model when the second machine speech is synthesized.

An acoustic feature difference between a synchronous machine speech unit and a corresponding segmented machine speech unit obtained by segmentation may be calculated by using the following formula:

$$TC = \sum_{n=1}^{N} w_n \cdot |f_a - f_b|. \tag{3}$$

In formula (3), TC indicates an acoustic feature difference, N indicates a quantity of acoustic parameters used when the acoustic feature difference is calculated, $f_a$ indicates an acoustic parameter corresponding to a synchronous machine speech unit a, $f_b$ indicates an acoustic parameter corresponding to a corresponding machine speech unit b obtained by segmentation, and $w_n$ indicates a weight of an $n^{th}$ prosodic feature. A smaller value of TC indicates that acoustic features of the synchronous machine speech unit a and the corresponding machine speech unit b obtained by segmentation better match each other.

In this embodiment, the acoustic feature difference is calculated by using the acoustic parameter difference between the synchronous machine speech unit and the corresponding machine speech unit obtained by segmentation, and parameters influencing the acoustic feature are used for calculation, thereby improving matching accuracy of the acoustic feature.

S510: Select a synchronous machine speech unit corresponding to a minimum acoustic feature difference as the second synchronous machine speech whose acoustic feature matches the acoustic feature of the second machine speech.

In this embodiment, the acoustic feature difference between the synchronous machine speech unit in the synchronous machine speech library and the machine speech unit included in the second machine speech is calculated, and is used as a restriction condition, and the synchronous machine speech unit matching the acoustic feature of the second machine speech is selected, thereby improving accuracy of selecting the acoustic feature, so that the speech obtained by conversion is more natural and better conforms to the required speech style of the speaker.

Figure 6:
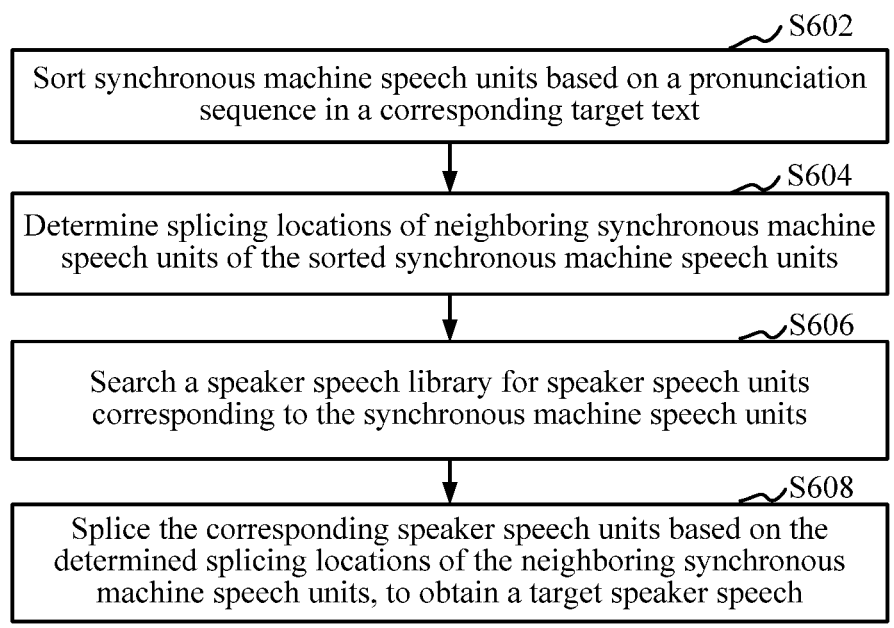
FIG. 6 is a schematic flowchart of a step of splicing speaker speech units corresponding to a synchronous machine speech unit in a speaker speech library, to obtain target speaker speech according to an embodiment.

As shown in FIG. 6, in an embodiment, step S314 specifically includes the following steps:

S602: Sort synchronous machine speech units of the second synchronous machine speech based on a pronunciation sequence in the corresponding target text. In other implementation, S602 may be: Sort the selected synchronous machine speech units based on a pronunciation sequence in the corresponding target text.

Specifically, when building the synchronous machine speech library, the terminal correspondingly establishes a correspondence between each synchronous machine speech unit in the synchronous machine speech library and a unit pronunciation of the synchronous machine speech unit. After selecting synchronous machine speech units, the terminal may sort the selected synchronous machine speech units in a pronunciation sequence in the target text based on unit pronunciations corresponding to the synchronous machine speech units.

S604: Determine splicing locations of neighboring synchronous machine speech units of the sorted synchronous machine speech units.

Specifically, the terminal may obtain unit acoustic parameters corresponding to neighboring synchronous machine speech units from the synchronous machine speech library, calculate similarity between the unit acoustic parameters corresponding to the neighboring synchronous machine speech units of the synchronous machine speech units, and determine splicing locations of the neighboring synchronous machine speech units of the sorted synchronous machine speech units based on the calculated similarity.

In an embodiment, step S604 specifically includes: obtaining speech frames obtained by segmenting the selected synchronous machine speech units; determining a quantity of overlapped spliced speech frames of the neighboring synchronous machine speech units, where speech frames of the neighboring synchronous machine speech units that correspond to the quantity of overlapped spliced speech frames have a minimum difference; and determining the splicing locations of the neighboring synchronous machine speech units of the sorted synchronous machine speech units based on the quantity of overlapped spliced speech frames.

Specifically, the terminal may preset duration of the speech frame, for example, 5 ms or 10 ms. The terminal may further segment the synchronous machine speech units in time domain based on the preset duration, to obtain a plurality of speech frames. In this embodiment, the terminal may sequentially increase the quantity of overlapped spliced speech frames of the neighboring synchronous machine speech units through enumeration, calculate, one by one based on an incremental increase of the quantity of overlapped spliced speech frames, a difference between the speech frames of the neighboring synchronous machine speech units that correspond to the quantity of overlapped spliced speech frames, and select a quantity of overlapped spliced speech frames corresponding to a minimum difference as the determined quantity of overlapped spliced speech frames.

Further, after determining the quantity of overlapped spliced speech frames of the neighboring synchronous machine speech units, the terminal may obtain a preconfigured splicing function, and determine, based on the splicing function, a required retained part of an overlapped spliced speech frame included by the synchronous machine speech unit sorted in the front and a required retained part of an overlapped spliced speech frame included by the synchronous machine speech unit sorted in the back, so that acoustic parameter transition better conforms to natural speech after splicing.

In this embodiment, the difference between the speech frames of the neighboring synchronous machine speech units that correspond to the quantity of overlapped spliced speech frames is used as a restriction condition, to select splicing locations of the neighboring synchronous machine speech units, thereby improving accuracy of selecting splicing locations, so that the speech obtained by conversion is more natural and better conforms to the required speech style of the speaker.

In another embodiment, the terminal may obtain speech states segmented from the selected synchronous machine speech units based on a hidden Markov model (HMM), determine a quantity of overlapped spliced speech states of the neighboring synchronous machine speech units, where a difference between speech states of the neighboring synchronous machine speech units that correspond to the quantity of overlapped spliced speech states is smallest, and determine splicing locations of the neighboring synchronous machine speech units of the sorted synchronous machine speech units based on the quantity of overlapped spliced speech states.

In an embodiment, the terminal may determine the quantity of overlapped spliced speech frames of the neighboring synchronous machine speech units based on the following formula:

$$\min\left(\sum_{t=1}^{T} CC_t\right). \quad (4)$$

T indicates the quantity of overlapped spliced speech frames of the neighboring synchronous machine speech units, t indicates a $t^{th}$ frame of the overlapped spliced speech frames of the neighboring synchronous machine speech units, $CC_t$ indicates a speech frame difference of the $t^{th}$ frame of the overlapped spliced speech frames of the neighboring synchronous machine speech units, and $$\min\left(\sum_{t=1}^{T} CC_t\right)$$

indicates solving T so that $$\sum_{t=1}^{T} CC_t$$

is smallest.

In an embodiment, $$\sum_{t=1}^{T} CC_t$$

may be calculated by using the following formula:

$$CC_{\Delta t} = \sum_{t=1}^{T} CC_t = \sum_{t=1}^{T} w_t \cdot \left(\sum_{n=1}^{N} w_n \cdot |f_{a,t} - f_{b,t}|\right). \quad (5)$$

$CC_{\Delta t}$ indicates a difference when the neighboring synchronous machine speech units have $\Delta t$ overlapped spliced speech frames. $f_{a,t}$ indicates an acoustic parameter of a $t^{th}$ frame of overlapped spliced speech frames included by a speech unit a sorted in the front in the neighboring synchronous machine speech units, and $f_{b,t}$ indicates an acoustic parameter of a $t^{th}$ frame of overlapped spliced speech frames included by a speech unit b sorted in the back in the neighboring synchronous machine speech units. N indicates a quantity of acoustic parameters selected when the speech frame difference is calculated, $w_n$ indicates a weight allocated to each selected acoustic parameter, and $w_t$ indicates a weight allocated to each speech frame.

This embodiment provides a method specifically used to solve the quantity of overlapped spliced frames that ensures a minimum difference between speech frames of the neighboring synchronous machine speech units that correspond to the quantity of overlapped spliced speech frames, so that a splicing location is selected more accurately.

S606: Search the speaker speech library for the speaker speech units corresponding to the synchronous machine speech units.

S608: Splice the corresponding speaker speech units based on the determined splicing locations of the neighboring synchronous machine speech units, to obtain the target speaker speech.

Specifically, after determining a splicing location of each synchronous machine speech unit, the terminal uses the splicing location as a splicing location of a corresponding speaker speech unit, and splices speaker speech units, to obtain the target speaker speech.

In this embodiment, neighboring speaker speech units are spliced based on determined splicing locations, so that splicing transition is more natural, and the speech obtained by conversion is more natural and better conforms to the required speech style of the speaker.

Figure 7:
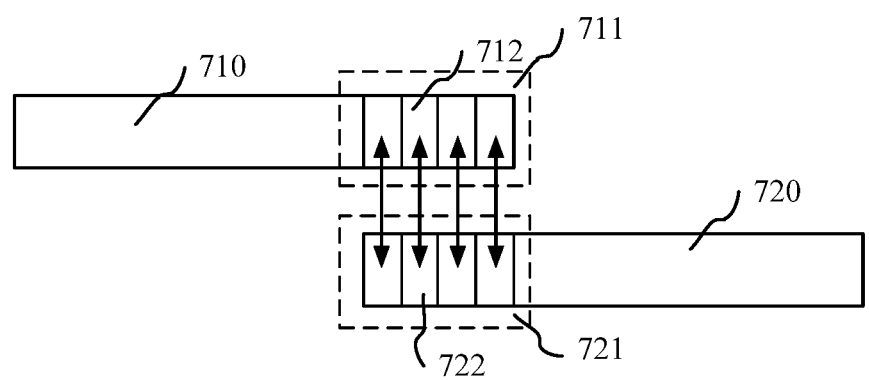
FIG. 7 is a schematic diagram of splicing neighboring speaker speech units according to an embodiment.

FIG. 7 is a schematic diagram of splicing neighboring speaker speech units according to an embodiment. Referring to FIG. 7, the schematic diagram includes a speaker speech unit 710 sorted in the front and a speaker speech unit 720 sorted in the back. The speaker speech unit 710 includes an overlapped spliced part 711, the overlapped spliced part 711 includes T speech frames, and a speech frame 712 is a $t^{th}$ frame of the overlapped spliced part of the speaker speech unit 710. The speaker speech unit 720 includes an overlapped spliced part 721, the overlapped spliced part 721 includes T speech frames, and a speech frame 722 is a $t^{th}$ frame of the overlapped spliced part of the speaker speech unit 720. The $t^{th}$ frame of the overlapped spliced part of the speech unit 710 overlaps the $t^{th}$ frame of the overlapped spliced part of the speaker speech unit 720 that is the speech frame 722.

In an embodiment, after determining an acoustic feature difference between each synchronous machine speech unit in each synchronous machine speech unit subset and a corresponding machine speech unit obtained by segmentation, the terminal may obtain a speaker speech unit corresponding to each synchronous machine speech unit from the speaker speech library. The terminal may further arrange and combine the obtained speaker speech units based on a pronunciation sequence in the corresponding target text, to obtain a plurality of to-be-spliced speaker speech unit sequences, determine a difference between neighboring speaker speech units in each to-be-spliced speaker speech unit sequence, and use an acoustic feature difference between each synchronous machine speech unit and a corresponding machine speech unit obtained by segmentation as the acoustic feature difference between the corresponding speaker speech unit and the corresponding machine speech unit obtained by segmentation.

The terminal may perform weighted summation on acoustic feature differences between speaker speech unit sequences in each to-be-spliced speaker speech unit sequence and corresponding machine speech units obtained by segmentation, to obtain target costs corresponding to each to-be-spliced speaker speech unit sequence. The terminal further performs weighted summation on differences between neighboring speaker speech units in each to-be-spliced speaker speech unit sequence, to obtain splicing costs corresponding to each to-be-spliced speaker speech unit sequence.

After obtaining the target costs and the splicing costs corresponding to each to-be-spliced speaker speech unit sequence, the terminal determines, by using a dynamic planning method, a splicing manner that ensures a minimum sum of the target costs and the splicing costs. Dynamic planning is a method for solving an optimal solution as a data calculation method.

In an embodiment, the speech conversion method further includes a process of building the asynchronous machine speech library and the synchronous machine speech library, and specifically includes: collecting history speaker speech; recognizing text content corresponding to the history speaker speech; generating the asynchronous machine speech unit sequence based on the recognized text content; building the asynchronous machine speech library based on the generated asynchronous machine speech unit sequence; obtaining a prosodic feature of the collected history speaker speech; generating the first synchronous machine speech unit sequence based on the recognized text content and the obtained prosodic feature; and building the synchronous machine speech library based on the generated first synchronous machine speech unit sequence. The process of building the asynchronous machine speech library and the synchronous machine speech library may be performed before S302.

Figure 8:
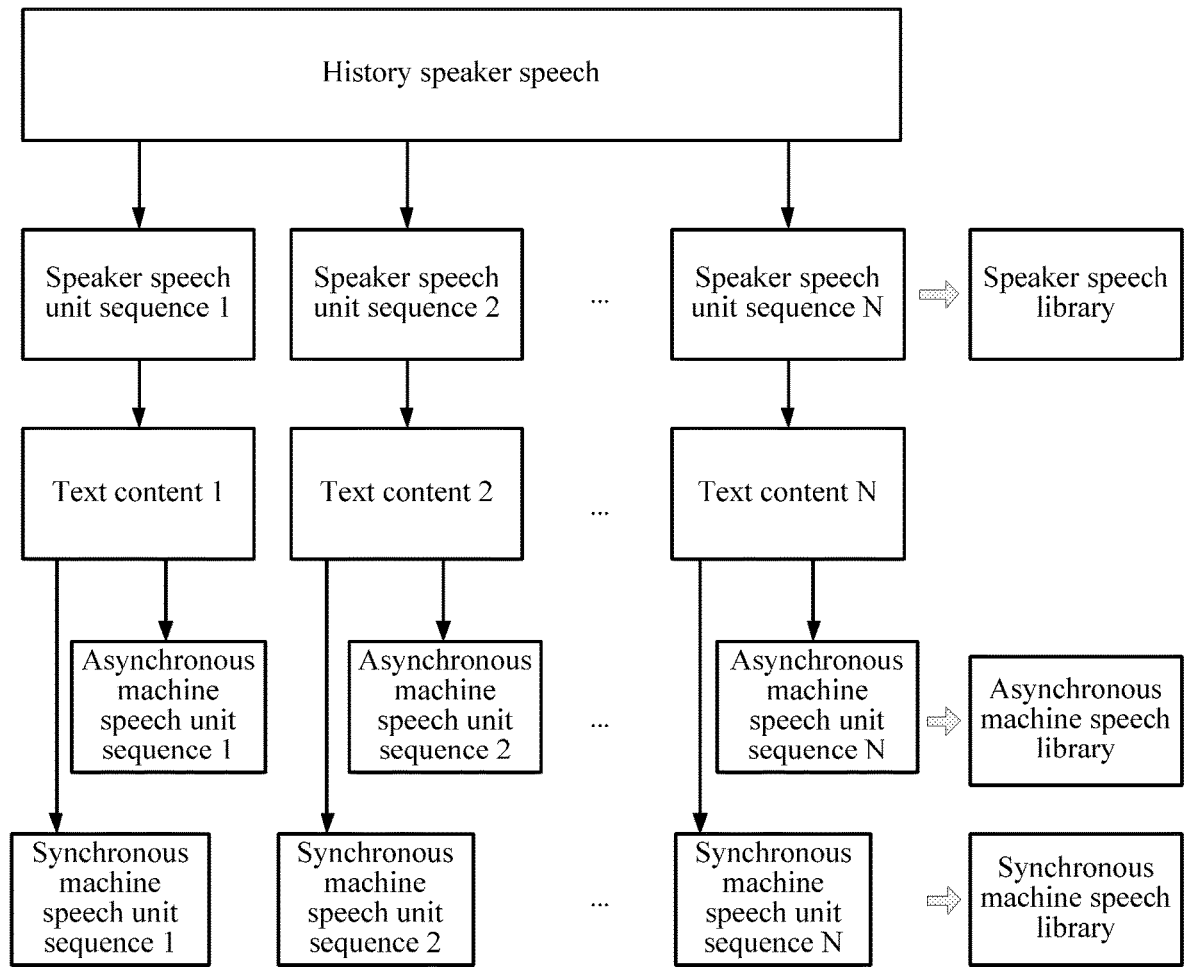
FIG. 8 is a logical block diagram of building a speech library according to an embodiment.

FIG. 8 is a logical block diagram of building a speech library according to an embodiment. Specifically, the terminal may collect history speaker speech in advance, where the collected history speaker speech may be speech waveforms collected by using a sound collection apparatus. The terminal may perform speech unit segmentation on each history speech waveform by using a speech recognition system, to obtain a corresponding speaker speech unit sequence and each unit waveform; recognize, by using the speech recognition system, text content corresponding to each speaker speech unit sequence, and annotate a pronunciation and duration distribution of each speech unit in each speaker speech unit sequence, to obtain a unit pronunciation of each speech unit. The terminal may build the speaker speech library based on the unit pronunciation, the unit waveform, and each speaker speech unit sequence that are obtained.

The terminal may synthesize an asynchronous machine speech unit sequence having a same pronunciation as that of each speech unit based on a pronunciation annotation of each speech unit by using an automatic speech synthesizing system, obtain a speech waveform corresponding to the asynchronous machine speech unit sequence, and output, by using an acoustic model, an acoustic parameter corresponding to the asynchronous machine speech unit sequence. Further, the terminal may classify, based on the asynchronous machine speech unit, speech waveforms and acoustic parameters corresponding to the asynchronous machine speech unit sequence, to obtain a unit waveform and a unit acoustic parameter corresponding to each asynchronous machine speech unit, and build the asynchronous machine speech library based on the unit pronunciation, each unit waveform, each unit acoustic parameter, and each asynchronous machine speech unit sequence.

The terminal may synthesize a synchronous machine speech unit sequence having both a same pronunciation and same duration distribution as those of each speech unit based on a pronunciation annotation and a duration distribution annotation of each speech unit by using the automatic speech synthesizing system, obtain a speech waveform corresponding to the synchronous machine speech unit sequence, and output, by using an acoustic model, an acoustic parameter corresponding to the synchronous machine speech unit sequence. Further, the terminal may classify, based on the synchronous machine speech unit, speech waveforms and acoustic parameters corresponding to the synchronous machine speech unit sequence, to obtain a unit waveform and a unit acoustic parameter corresponding to each synchronous machine speech unit, and build the synchronous machine speech library based on the unit pronunciation, each unit waveform, each unit acoustic parameter, and each synchronous machine speech unit sequence.

Still further, the terminal may align the speaker speech unit sequence in the speaker speech library, the asynchronous machine speech unit sequence in the asynchronous machine speech library, and the synchronous machine speech unit sequence in the synchronous machine speech library based on corresponding text content, and build a parallel speech library through combination.

For example, the history speaker speech (Guangdong accent) is: "ta-zai hui ji shang-na zhe yi duo-xian fa", and recognized text content is: "ta zai fei ji shang na zhe yi duo xian hua". A synthesized asynchronous machine speech unit sequence is: "ta zai-fei ji shang-na zhe-yi duo xian hua". In this case, pronunciations are the same as those of text content, and a prosodic feature conforms to a machine prosodic feature. A synthesized synchronous machine speech unit sequence is: "ta-zai fei ji shang-na zhe yi duo-xian hua". In this case, pronunciations are the same as those of the text content, and a prosodic feature conforms to a speaker prosodic feature. "-" indicates a prosodic pause between speech.

In this embodiment, the asynchronous machine speech library including the asynchronous machine speech unit sequences having the same text content as that in the speaker speech unit sequence in the speaker speech library is built, and a correspondence between a speaker speech style and a machine speech style is established, so that the prosodic feature of the target text is selected more accurately. The synchronous machine speech library including the synchronous machine speech unit sequences having the same text content and the same prosodic feature as those in the speaker speech unit sequence in the speaker speech library is built, and a correspondence between a machine speech and a speaker speech that have a same prosodic feature is established, so that a speaker speech unit used to obtain the target speaker speech through splicing is selected more accurately.

Figure 9:
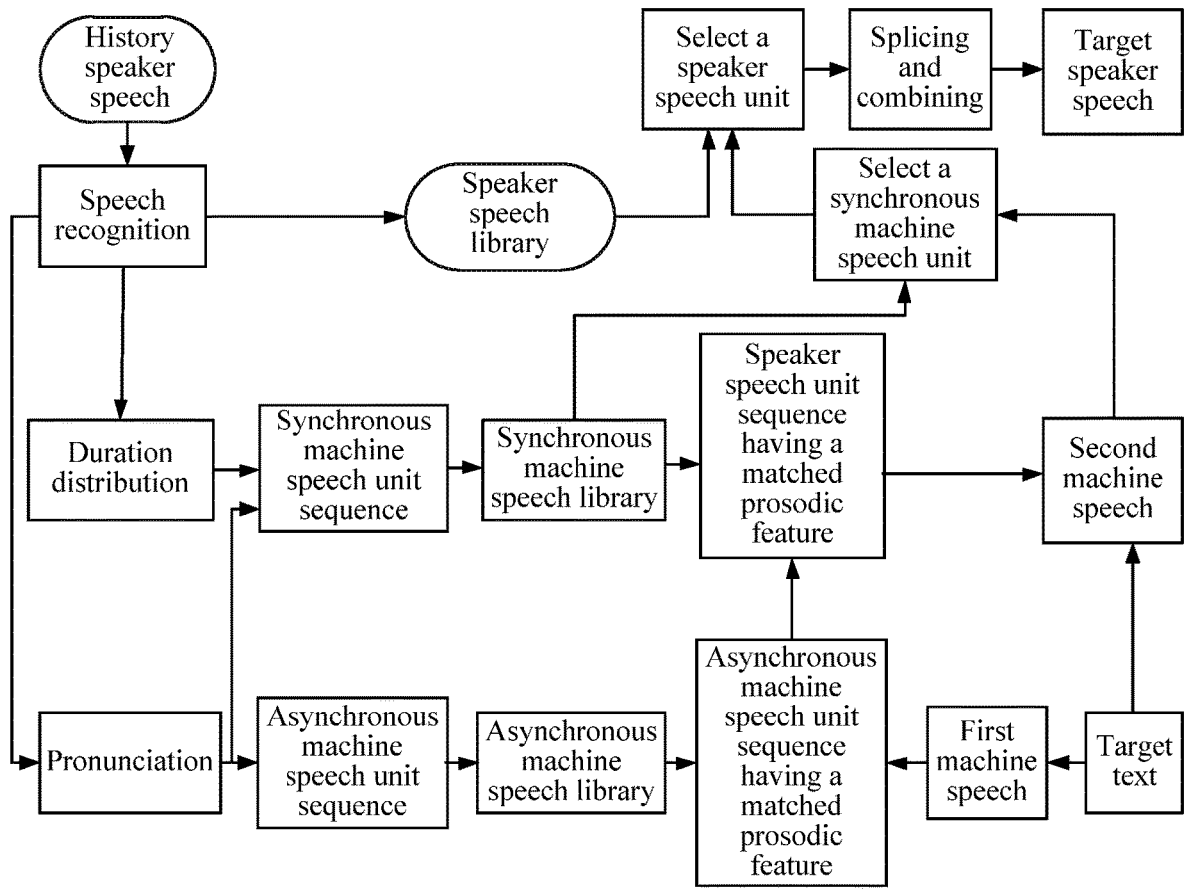
FIG. 9 is a logical block diagram of a speech conversion method according to an embodiment.

FIG. 9 is a logical block flowchart of a speech conversion method according to an embodiment. As shown in FIG. 9, a terminal may collect history speaker speech in advance, and perform speech recognition on the history speaker speech to obtain a speaker speech library. The terminal further annotates a pronunciation and duration distribution of each speech unit, synthesizes asynchronous machine speech unit sequences based on pronunciation annotation by using a TTS parameter synthesizing system, to build an asynchronous machine speech library, and synthesizes synchronous machine speech unit sequences based on pronunciation annotation and duration distribution annotation by using the TTS parameter synthesizing system, to build a synchronous machine speech library.

The terminal may obtain target text, synthesize first machine speech based on the target text, and select an asynchronous machine speech unit sequence whose prosodic feature matches the prosodic feature of the first machine speech from the asynchronous machine speech library. The terminal searches the synchronous machine speech library for a first synchronous machine speech unit sequence corresponding to the asynchronous machine speech unit sequence, and synthesizes, based on a prosodic feature of the first synchronous machine speech unit sequence, second machine speech corresponding to the target text. The terminal may further select, based on an acoustic feature of the second machine speech, a synchronous machine speech unit matching the acoustic feature of the second machine speech from the synchronous machine speech library; select speaker speech units corresponding to the synchronous machine speech unit from the speaker speech library; and splice the selected speaker speech units to obtain target speaker speech. Because the first synchronous machine speech unit sequence and the speaker speech unit sequence have same duration distribution, the prosodic feature of the first synchronous machine speech unit sequence may be used as the prosodic feature of the speaker speech unit sequence.

It should be understood that the steps in the embodiments of this application are not necessarily sequentially performed in an order indicated by step numbers. Unless otherwise clearly described in this specification, an order of performing the steps is not strictly limited, and the steps may be performed in another order. In addition, at least some steps in the embodiments may include a plurality of sub-steps or a plurality of stages. The sub-steps or stages are not necessarily performed at a same moment, and instead may be performed at different moments. The sub-steps or stages are not necessarily sequentially performed, and instead the sub-steps or stages and at least some of other steps or sub-steps or stages of other steps may be performed by turns or alternately.

Figure 10:
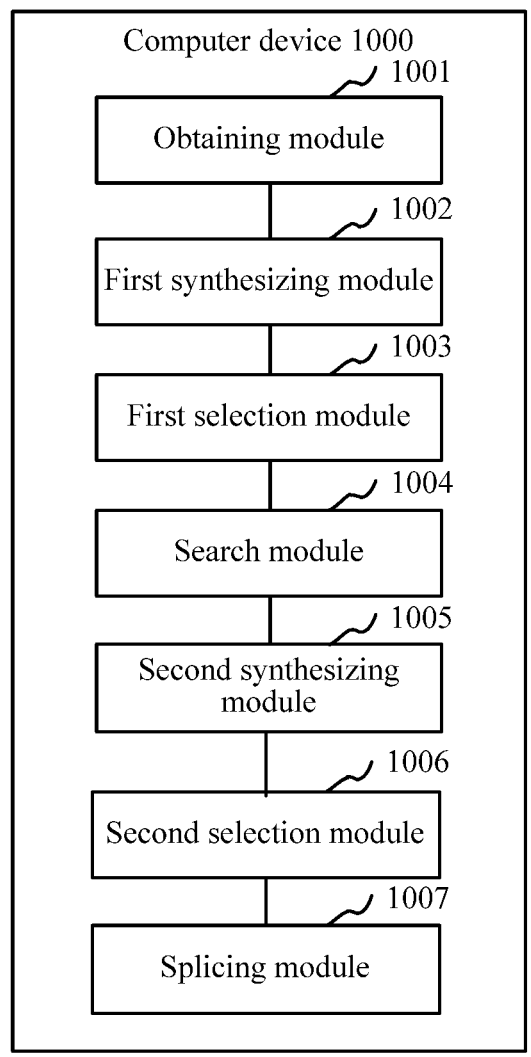
FIG. 10 is a structural block diagram of a computer device according to an embodiment.

As shown in FIG. 10, an embodiment provides a computer device 1000. For an internal structure of the computer device 1000, refer to the structure shown in FIG. 1. Some or all of the following modules may be implemented by using software, hardware, or a combination thereof. Referring to FIG. 10, the computer device 1000 includes: an obtaining module 1001, a first synthesizing module 1002, a first selection module 1003, a search module 1004, a second synthesizing module 1005, a second selection module 1006, and a splicing module 1007.

The obtaining module 1001 is configured to obtain target text.

The first synthesizing module 1002 is configured to synthesize first machine speech corresponding to the target text.

The first selection module 1003 is configured to select an asynchronous machine speech unit sequence whose prosodic feature matches a prosodic feature of the first machine speech from an asynchronous machine speech library.

The search module 1004 is configured to search a synchronous machine speech library for a first synchronous machine speech unit sequence corresponding to the asynchronous machine speech unit sequence.

The second synthesizing module 1005 is configured to synthesize, based on a prosodic feature of the first synchronous machine speech unit sequence, second machine speech corresponding to the target text.

The second selection module 1006 is configured to select a synchronous machine speech unit matching an acoustic feature of the second machine speech from the synchronous machine speech library.

The splicing module 1007 is configured to splice speaker speech units corresponding to the synchronous machine speech unit in a speaker speech library, to obtain target speaker speech.

Text content of the synchronous machine speech library, the asynchronous machine speech library, and the speaker speech library is the same, and prosodic features of the speaker speech library and the synchronous machine speech library match each other.

The speech unit used by the computer device 1000 to obtain the target speaker speech through splicing is selected from the speaker speech library, and the spliced and converted speech retains the timbre of the speaker. In addition, a correspondence between the asynchronous machine speech unit sequence conforming to the machine prosodic feature in the asynchronous machine speech library and the first synchronous machine speech unit sequence conforming to the prosodic feature of the speaker in the synchronous machine speech library is used. After the first machine speech conforming to the machine prosodic feature is synthesized, the prosodic feature conforming to the speech style of the speaker is determined based on the correspondence. The second machine speech is then synthesized based on the prosodic feature, and the synchronous machine speech unit matching the acoustic feature of the second machine speech is selected from the synchronous machine speech library based on the acoustic feature of the second machine speech. Speaker speech units corresponding to the selected synchronous machine speech unit in the speaker speech library are spliced to obtain the target speaker speech, thereby retaining the prosodic feature of the speaker. In this way, both the timbre of the speaker and the prosodic feature of the speaker are retained, so that the speech obtained by conversion is more natural and better conforms to the required speech style of the speaker, thereby improving a speech conversion effect.

In an embodiment, the first selection module 1003 is further configured to: obtain a candidate asynchronous machine speech unit sequence from the asynchronous machine speech library based on the first machine speech; determine a prosodic feature difference between the candidate asynchronous machine speech unit sequence and the first machine speech; and use a candidate asynchronous machine speech unit sequence corresponding to a minimum prosodic feature difference as the asynchronous machine speech unit sequence whose prosodic feature matches the prosodic feature of the first machine speech.

In this embodiment, the prosodic feature difference between the asynchronous machine speech unit sequence in the asynchronous machine speech library and the first machine speech is calculated, and is used as a restriction condition, and the asynchronous machine speech unit sequence matching the prosodic feature of the first machine speech is selected, thereby improving accuracy of selecting the prosodic feature, so that the speech obtained by conversion is more natural and better conforms to the required speech style of the speaker.

In an embodiment, the first selection module 1003 is further configured to: determine a quantity of machine speech units included in the first machine speech; and obtain a candidate asynchronous machine speech unit sequence including the same quantity of asynchronous machine speech units as the determined quantity from the asynchronous machine speech library.

In this embodiment, the candidate asynchronous machine speech unit sequence is selected based on the quantity of machine speech units included in the first machine speech, to calculate the prosodic feature difference, thereby improving reliability of a calculation result of the prosodic feature difference.

In an embodiment, the first selection module 1003 is further configured to: traverse asynchronous machine speech unit sequences included in the asynchronous machine speech library; when a quantity of asynchronous machine speech units included in an asynchronous machine speech unit sequence that is traversed to is less than the determined quantity, continue the traversal; when a quantity of asynchronous machine speech units included in an asynchronous machine speech unit sequence that is traversed to is equal to the determined quantity, use the asynchronous machine speech unit sequence that is traversed to as the candidate asynchronous machine speech unit sequence; and when a quantity of asynchronous machine speech units included in an asynchronous machine speech unit sequence that is traversed to is greater than the determined quantity, segment the asynchronous machine speech unit sequence that is traversed to, to obtain the candidate asynchronous machine speech unit sequence based on a sequence of the included asynchronous machine speech units and the determined quantity.

In this embodiment, an asynchronous machine speech unit sequence including a quantity of asynchronous machine speech units greater than the quantity of machine speech units included in the second machine speech is segmented to obtain an asynchronous machine speech unit sub-sequence as the candidate asynchronous machine speech unit sequence based on a sequence of the included asynchronous machine speech units and the determined quantity, thereby conforming to natural language coherency, ensuring reliability of a calculation result of the prosodic feature difference, and improving corpus usage of the asynchronous machine speech library.

In an embodiment, the first selection module 1003 is further configured to: segment the first machine speech to obtain machine speech units; and generate the prosodic feature difference between the candidate asynchronous machine speech unit sequence and the first machine speech based on a prosodic parameter difference between each asynchronous machine speech unit included in the candidate asynchronous machine speech unit sequence and a respective corresponding machine speech unit obtained by segmentation, where the prosodic parameter difference includes at least one of a duration difference, a fundamental frequency change rate difference, a duration distribution difference of an acoustic parameter, and a probability distribution difference of a fundamental frequency change rate.

In this embodiment, the prosodic feature difference is calculated by using the prosodic parameter difference between each asynchronous machine speech unit included in the candidate asynchronous machine speech unit sequence and a corresponding machine speech unit obtained by segmentation, and parameters influencing the prosodic feature are used for calculation, thereby improving matching accuracy of the prosodic feature.

In an embodiment, the second selection module 1006 is further configured to: segment the second machine speech to obtain machine speech units; determine pronunciation features of the machine speech units obtained by segmentation; select, from the synchronous machine speech library, a synchronous machine speech unit subset whose pronunciation feature matches the pronunciation features of the machine speech units obtained by segmentation; determine an acoustic feature difference between each synchronous machine speech unit in each synchronous machine speech unit subset and a corresponding machine speech unit obtained by segmentation; and select a synchronous machine speech unit corresponding to a minimum acoustic feature difference as the synchronous machine speech unit whose acoustic feature matches the acoustic feature of the second machine speech.

In this embodiment, the acoustic feature difference between the synchronous machine speech unit in the synchronous machine speech library and the machine speech unit included in the second machine speech is calculated, and is used as a restriction condition, and the synchronous machine speech unit matching the acoustic feature of the second machine speech is selected, thereby improving accuracy of selecting the acoustic feature, so that the speech obtained by conversion is more natural and better conforms to the required speech style of the speaker.

In an embodiment, the second selection module 1006 is further configured to: determine an acoustic parameter of each synchronous machine speech unit in each synchronous machine speech unit subset; determine acoustic parameters of the machine speech units obtained by segmentation; calculate a corresponding acoustic parameter difference between each synchronous machine speech unit and a corresponding machine speech unit obtained by segmentation; and generate, based on the difference, an acoustic feature difference in positive correlation with the difference.

In this embodiment, the acoustic feature difference is calculated by using the acoustic parameter difference between the synchronous machine speech unit and the corresponding machine speech unit obtained by segmentation, and parameters influencing the acoustic feature are used for calculation, thereby improving matching accuracy of the acoustic feature.

In an embodiment, the splicing module 1007 is further configured to: sort the synchronous machine speech units based on a pronunciation sequence in the corresponding target text; determine splicing locations of neighboring synchronous machine speech units of the sorted synchronous machine speech units; search the speaker speech library for the speaker speech units corresponding to the synchronous machine speech units; and splice the corresponding speaker speech units based on the determined splicing locations of the neighboring synchronous machine speech units, to obtain the target speaker speech.

In this embodiment, neighboring speaker speech units are spliced based on determined splicing locations, so that splicing transition is more natural, and the speech obtained by conversion is more natural and better conforms to the required speech style of the speaker.

In an embodiment, the splicing module 1007 is further configured to: obtain speech frames obtained by segmenting the selected synchronous machine speech units; determine a quantity of overlapped spliced speech frames of the neighboring synchronous machine speech units, where speech frames of the neighboring synchronous machine speech units that correspond to the quantity of overlapped spliced speech frames have a minimum difference; and determine the splicing locations of the neighboring synchronous machine speech units of the sorted synchronous machine speech units based on the quantity of overlapped spliced speech frames.

In this embodiment, the difference between the speech frames of the neighboring speaker speech units that correspond to the quantity of overlapped spliced speech frames is used as a restriction condition, to select splicing locations of the neighboring speaker speech units, thereby improving accuracy of selecting splicing locations, so that the speech obtained by conversion is more natural and better conforms to the required speech style of the speaker.

In an embodiment, the splicing module 1007 is further configured to determine the quantity of overlapped spliced speech frames of the neighboring synchronous machine speech units based on the following formula:

$$\min\left(\sum_{t=1}^{T} CC_t\right). \tag{6}$$

T indicates the quantity of overlapped spliced speech frames of the neighboring synchronous machine speech units, t indicates a $t^{th}$ frame of the overlapped spliced speech frames of the neighboring synchronous machine speech units, $CC_t$ indicates a speech frame difference of the $t^{th}$ frame of the overlapped spliced speech frames of the neighboring synchronous machine speech units, and $$\min\left(\sum_{t=1}^{T} CC_t\right)$$

indicates solving T so that $$\sum_{t=1}^{T} CC_t$$

is smallest.

This embodiment provides a method specifically used to solve the quantity of overlapped spliced frames that ensures a minimum difference between speech frames of the neighboring synchronous machine speech units that correspond to the quantity of overlapped spliced speech frames, so that a splicing location is selected more accurately.

Figure 11:
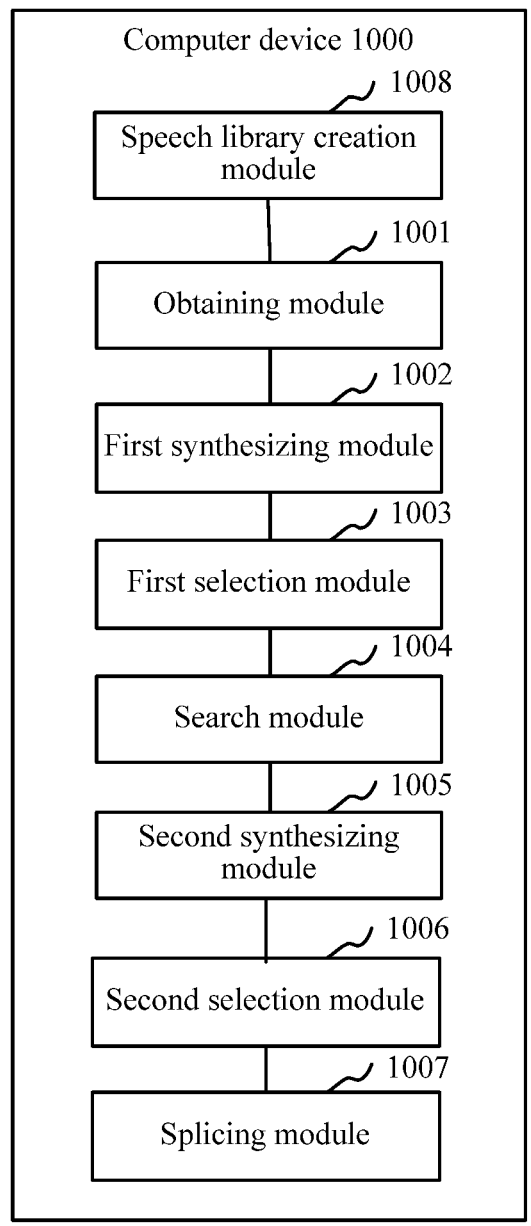
FIG. 11 is a structural block diagram of a computer device according to another embodiment.

As shown in FIG. 11, in an embodiment, the computer device 1000 further includes a speech library creation module 1008.

The speech library creation module 1008 is configured to: collect history speaker speech; recognize text content corresponding to the history speaker speech; generate the asynchronous machine speech unit sequence based on the recognized text content; build the asynchronous machine speech library based on the generated asynchronous machine speech unit sequence; obtain a prosodic feature of the collected history speaker speech; generate the first synchronous machine speech unit sequence based on the recognized text content and the obtained prosodic feature; and build the synchronous machine speech library based on the generated first synchronous machine speech unit sequence.

In this embodiment, the asynchronous machine speech library including the asynchronous machine speech unit sequences having the same text content as that in the speaker speech unit sequence in the speaker speech library is built, and a correspondence between a speaker speech style and a machine speech style is established, so that the prosodic feature of the target text is selected more accurately. The synchronous machine speech library including the synchronous machine speech unit sequences having the same text content and the same prosodic feature as those in the speaker speech unit sequence in the speaker speech library is built, and a correspondence between a machine speech and a speaker speech that have a same prosodic feature is established, so that a speaker speech unit used to obtain the target speaker speech through splicing is selected more accurately.

A person of ordinary skill in the art may understand that all or some of the processes of the methods in the embodiments may be implemented by a computer program instructing relevant hardware. The program may be stored in a non-volatile computer readable storage medium. When the program runs, the processes in the embodiments of the methods may be performed. Any citation of a memory, a storage, a database, or other mediums in the embodiments of this application may include a non-volatile and/or volatile memory. The non-volatile memory may include a read-only memory (ROM), a programmable ROM (PROM), an electrically programmable ROM (EPROM), an electrically erasable programmable ROM (EEPROM), or a flash. The volatile memory may include a random access memory (RAM) or an external cache memory. For the purpose of description instead of limitation, the RAM may be obtained in a plurality of forms, for example, a static RAM (SRAM), a dynamic RAM (DRAM), a synchronous DRAM (SDRAM), a double data rate SDRAM (DDRSDRAM), an enhanced SDRAM (ESDRAM), a synchronous link (Synchlink) DRAM (SLDRAM), a Rambus (Rambus) direct RAM (RDRAM), a direct Rambus dynamic RAM (DRDRAM), and a Rambus dynamic RAM (RDRAM).

The technical features of the foregoing embodiments may be randomly combined. For the purpose of concise descriptions, not all possible combinations of the technical features in the foregoing embodiments are described, but as long as combinations of the technical features do not conflict each other, the combinations of the technical features should be considered as falling within the scope of this specification.

The foregoing embodiments are only several implementations of this application and are described in detail, but cannot be understood as limiting the patent scope of this disclosure. It should be noted that a person of ordinary skill in the art may further make several variations and improvements without departing from the idea of this application, and the variations and improvements all fall within the protection scope of this application. Therefore, the patent protection scope of this application shall be subject to the appended claims.

What is claimed is:

1. A method for converting text to speech, comprising:
   obtaining, by a device comprising a memory storing instructions and a processor in communication with the memory, target text;
   synthesizing, by the device, a first machine speech corresponding to the target text;
   searching, by the device, an asynchronous machine speech library to select an asynchronous machine speech whose prosodic feature matches a prosodic feature of the first machine speech;
   searching, by the device, a synchronous machine speech library to select a first synchronous machine speech corresponding to the asynchronous machine speech;
   synthesizing, by the device based on a prosodic feature of the selected synchronous machine speech, a second machine speech corresponding to the target text;
   searching, by the device, the synchronous machine speech library to select a second synchronous machine speech whose acoustic feature matches an acoustic feature of the second machine speech;
   splicing speaker speech units in a speaker speech library, by the device corresponding to the second synchronous machine speech, to obtain a target speaker speech; and
   wherein:
      text content of the synchronous machine speech library, text content of the asynchronous machine speech library, and text content of the speaker speech library are the same, and
      a prosodic feature of the speaker speech library matches a prosodic feature of the synchronous machine speech library.

2. The method according to claim 1, wherein the searching, by the device, the asynchronous machine speech library to select the asynchronous machine speech whose prosodic feature matches the prosodic feature of the first machine speech comprises:
   obtaining, by the device, a candidate asynchronous machine speech from the asynchronous machine speech library based on the first machine speech;
   determining, by the device, a prosodic feature difference between the candidate asynchronous machine speech and the first machine speech; and
   using, by the device, a candidate asynchronous machine speech corresponding to a minimum prosodic feature difference as the asynchronous machine speech whose prosodic feature matches the prosodic feature of the first machine speech.

3. The method according to claim 2, wherein the obtaining, by the device, the candidate asynchronous machine speech from the asynchronous machine speech library based on the first machine speech comprises:
   determining, by the device, a quantity of machine speech units comprised in the first machine speech; and
   obtaining, by the device, the candidate asynchronous machine speech comprising the same quantity of asynchronous machine speech units as the determined quantity from the asynchronous machine speech library.

4. The method according to claim 3, wherein the obtaining, by the device, the candidate asynchronous machine speech comprising the same quantity of asynchronous machine speech units as the determined quantity from the asynchronous machine speech library comprises:
   searching, by the device, the asynchronous machine speech library to obtain an asynchronous machine speech;
   when a quantity of asynchronous machine speech units comprised in the obtained asynchronous machine speech is less than the determined quantity, continuing, by the device, the search;
   when the quantity of asynchronous machine speech units comprised in the obtained asynchronous machine speech is equal to the determined quantity, using, by the device, the obtained asynchronous machine speech as the candidate asynchronous machine speech; and
   when the quantity of asynchronous machine speech units comprised in the obtained asynchronous machine speech is greater than the determined quantity, segmenting, by the device, the obtained asynchronous machine speech, to obtain the candidate asynchronous machine speech based on a sequence of the comprised asynchronous machine speech units and the determined quantity.

5. The method according to claim 2, wherein the determining, by the device, the prosodic feature difference between the candidate asynchronous machine speech and the first machine speech comprises:
   segmenting, by the device, the first machine speech to obtain machine speech units; and
   generating, by the device, the prosodic feature difference between the candidate asynchronous machine speech and the first machine speech based on a prosodic parameter difference between each asynchronous machine speech unit comprised in the candidate asynchronous machine speech and a respective corresponding machine speech unit obtained by segmentation, wherein
   the prosodic parameter difference comprises at least one of a duration difference, a fundamental frequency change rate difference, a duration distribution difference of an acoustic parameter, or a probability distribution difference of a fundamental frequency change rate.

6. The method according to claim 1, wherein the searching, by the device, the synchronous machine speech library to select the second synchronous machine speech whose acoustic feature matches the acoustic feature of the second machine speech comprises:

segmenting, by the device, the second machine speech to obtain machine speech units;

determining, by the device, a pronunciation feature of the machine speech units;

selecting, by the device from the synchronous machine speech library, a synchronous machine speech unit subset whose pronunciation feature matches the pronunciation feature of the machine speech units;

determining, by the device, an acoustic feature difference between each of the synchronous machine speech unit subset and the corresponding machine speech unit; and selecting, by the device, a synchronous machine speech unit corresponding to a minimum acoustic feature difference as the second synchronous machine speech whose acoustic feature matches the acoustic feature of the second machine speech.

7. The method according to claim 6, wherein the determining, by the device, an acoustic feature difference between each of the synchronous machine speech unit subset and the corresponding machine speech unit comprises:

determining, by the device, an acoustic parameter of each of the synchronous machine speech unit subset;

determining, by the device, an acoustic parameter of each of the machine speech units;

calculating, by the device, a corresponding acoustic parameter difference between the acoustic parameter of each of the synchronous machine speech unit subset and the acoustic parameter of each of the machine speech units; and generating, by the device based on the corresponding acoustic parameter difference, an acoustic feature difference, wherein the acoustic feature difference is in positive correlation with the corresponding acoustic parameter difference.

8. The method according to claim 1, wherein the splicing the speaker speech units in the speaker speech library, by the device corresponding to the second synchronous machine speech, to obtain the target speaker speech comprises:

sorting, by the device, synchronous machine speech units of the second synchronous machine speech based on a pronunciation sequence in the corresponding target text;

determining, by the device, splicing locations of neighboring synchronous machine speech units of the sorted synchronous machine speech units;

searching, by the device, the speaker speech library for the speaker speech units corresponding to the synchronous machine speech units; and splicing, by the device, the corresponding speaker speech units based on the determined splicing locations of the neighboring synchronous machine speech units, to obtain the target speaker speech.

9. The method according to claim 8, wherein the determining, by the device, splicing locations of neighboring synchronous machine speech units of the sorted synchronous machine speech units comprises:

obtaining, by the device, speech frames obtained by segmenting the synchronous machine speech units;

determining, by the device, a quantity of overlapped spliced speech frames of the neighboring synchronous machine speech units, wherein speech frames of the neighboring synchronous machine speech units that correspond to the quantity of overlapped spliced speech frames have a minimum difference; and determining, by the device, the splicing locations of the neighboring synchronous machine speech units of the sorted synchronous machine speech units based on the quantity of overlapped spliced speech frames.

10. The method according to claim 9, wherein the determining, by the device, a quantity of overlapped spliced speech frames of the neighboring synchronous machine speech units, wherein speech frames of the neighboring synchronous machine speech units that correspond to the quantity of overlapped spliced speech frames have a minimum difference comprises:

the quantity of overlapped spliced speech frames of the neighboring synchronous machine speech units satisfying $$\min\left(\sum_{t=1}^{T} CC_t\right),$$

wherein T indicates the quantity of overlapped spliced speech frames of the neighboring synchronous machine speech units, t indicates a $t^{th}$ frame of the overlapped spliced speech frames of the neighboring synchronous machine speech units, $CC_t$ indicates a speech frame difference of the $t^{th}$ frame of the overlapped spliced speech frames of the neighboring synchronous machine speech units, and $$\min\left(\sum_{t=1}^{T} CC_t\right)$$

indicates solving T so that $$\sum_{t=1}^{T} CC_t$$

is smallest.

11. The method according to claim 1, wherein the method further comprises:

collecting, by the device, a history speaker speech;

recognizing, by the device, text content corresponding to the history speaker speech;

generating, by the device, an asynchronous machine speech based on the recognized text content;

building, by the device, the asynchronous machine speech library based on the generated asynchronous machine speech;

obtaining, by the device, a prosodic feature of the collected history speaker speech;

generating, by the device, a synchronous machine speech based on the recognized text content and the obtained prosodic feature; and building, by the device, the synchronous machine speech library based on the generated synchronous machine speech.

12. A device, comprising a memory and a processor, the memory storing a computer-readable instructions, and wherein, when the computer-readable instructions are executed by the processor, the processor is configured to:

obtain target text;
synthesize a first machine speech corresponding to the target text;
search an asynchronous machine speech library to select an asynchronous machine speech whose prosodic feature matches a prosodic feature of the first machine speech;
search a synchronous machine speech library to select a first synchronous machine speech corresponding to the asynchronous machine speech;
synthesize, based on a prosodic feature of the first synchronous machine speech, a second machine speech corresponding to the target text;
search the synchronous machine speech library to select a second synchronous machine speech whose acoustic feature matches an acoustic feature of the second machine speech;
splice speaker speech units in a speaker speech library, corresponding to the second synchronous machine speech, to obtain a target speaker speech; and
wherein:
 text content of the synchronous machine speech library, text content of the asynchronous machine speech library, and text content of the speaker speech library are the same, and
 a prosodic feature of the speaker speech library matches a prosodic feature the synchronous machine speech library.

13. The device according to claim 12, wherein, when the processor is configured to perform searching the asynchronous machine speech library to select the asynchronous machine speech whose prosodic feature matches the prosodic feature of the first machine speech, the processor is configured to:
 obtain a candidate asynchronous machine speech from the asynchronous machine speech library based on the first machine speech;
 determine a prosodic feature difference between the candidate asynchronous machine speech and the first machine speech; and
 use a candidate asynchronous machine speech corresponding to a minimum prosodic feature difference as the asynchronous machine speech whose prosodic feature matches the prosodic feature of the first machine speech.

14. The device according to claim 12, wherein when the processor is configured to perform searching the synchronous machine speech library to select the second synchronous machine speech whose acoustic feature matches the acoustic feature of the second machine speech, the processor is configured to:
 segment the second machine speech to obtain machine speech units;
 determine a pronunciation feature of the machine speech units;
 select, from the synchronous machine speech library, a synchronous machine speech unit subset whose pronunciation feature matches the pronunciation feature of the machine speech units;
 determine an acoustic feature difference between each of the synchronous machine speech unit subset and the corresponding machine speech unit; and
 select a synchronous machine speech unit corresponding to a minimum acoustic feature difference as the second synchronous machine speech whose acoustic feature matches the acoustic feature of the second machine speech.

15. The device according to claim 12, wherein when the processor is configured to perform splicing speaker speech units in the speaker speech library, corresponding to the second synchronous machine speech, to obtain the target speaker speech, the processor is configured to:
 sort synchronous machine speech units of the second synchronous machine speech based on a pronunciation sequence in the corresponding target text;
 determine splicing locations of neighboring synchronous machine speech units of the sorted synchronous machine speech units;
 search the speaker speech library for the speaker speech units corresponding to the synchronous machine speech units; and
 splice the corresponding speaker speech units based on the determined splicing locations of the neighboring synchronous machine speech units, to obtain the target speaker speech.

16. The device according to claim 12, wherein when the computer-readable instructions are executed by the processor, the processor is further configured to:
 collect a history speaker speech;
 recognize text content corresponding to the history speaker speech;
 generate an asynchronous machine speech based on the recognized text content;
 build the asynchronous machine speech library based on the generated asynchronous machine speech;
 obtain a prosodic feature of the collected history speaker speech;
 generate a synchronous machine speech based on the recognized text content and the obtained prosodic feature; and
 build the synchronous machine speech library based on the generated synchronous machine speech.

17. A non-transitory computer readable storage medium storing computer-readable instructions, and wherein, when the computer-readable instructions are executed by a processor, the computer-readable instructions cause the processor to:
 obtain target text;
 synthesize a first machine speech corresponding to the target text;
 search an asynchronous machine speech library to select an asynchronous machine speech whose prosodic feature matches a prosodic feature of the first machine speech;
 search a synchronous machine speech library to select a first synchronous machine speech corresponding to the asynchronous machine speech;
 synthesize, based on a prosodic feature of the first synchronous machine speech, a second machine speech corresponding to the target text;
 search the synchronous machine speech library to select a second synchronous machine speech whose acoustic feature matches an acoustic feature of the second machine speech;
 splice speaker speech units in a speaker speech library, corresponding to the second synchronous machine speech, to obtain target speaker speech; and
 wherein:
  text content of the synchronous machine speech library, text content of the asynchronous machine speech library, and text content of the speaker speech library are the same, and a prosodic feature of the speaker speech library matches a prosodic feature of the synchronous machine speech library.

18. The storage medium according to claim 17, wherein, when the computer-readable instructions cause the processor to search the asynchronous machine speech library to select the asynchronous machine speech whose prosodic feature matches the prosodic feature of the first machine speech, the computer-readable instructions cause the processor to:
- obtain a candidate asynchronous machine speech from the asynchronous machine speech library based on the first machine speech;
- determine a prosodic feature difference between the candidate asynchronous machine speech and the first machine speech; and
- use a candidate asynchronous machine speech corresponding to a minimum prosodic feature difference as the asynchronous machine speech whose prosodic feature matches the prosodic feature of the first machine speech.

19. The storage medium according to claim 17, wherein, when the computer-readable instructions cause the processor to search the synchronous machine speech library to select the second synchronous machine speech whose acoustic feature matches the acoustic feature of the second machine speech, the computer-readable instructions cause the processor to:
- segment the second machine speech to obtain machine speech units;
- determine a pronunciation feature of the machine speech units;
- select, from the synchronous machine speech library, a synchronous machine speech unit subset whose pronunciation feature matches the pronunciation feature of the machine speech units;
- determine an acoustic feature difference between each of the synchronous machine speech unit subset and the corresponding machine speech unit; and
- select a synchronous machine speech unit corresponding to a minimum acoustic feature difference as the second synchronous machine speech whose acoustic feature matches the acoustic feature of the second machine speech.

20. The storage medium according to claim 17, wherein when the computer-readable instructions cause the processor to splice the speaker speech units in the speaker speech library, corresponding to the second synchronous machine speech, to obtain the target speaker speech, the computer-readable instructions cause the processor to:
- sort synchronous machine speech units of the second synchronous machine speech based on a pronunciation sequence in the corresponding target text;
- determine splicing locations of neighboring synchronous machine speech units of the sorted synchronous machine speech units;
- search the speaker speech library for the speaker speech units corresponding to the synchronous machine speech units; and
- splice the corresponding speaker speech units based on the determined splicing locations of the neighboring synchronous machine speech units, to obtain the target speaker speech.

* * * * *